(12) United States Patent
Codrescu et al.

(10) Patent No.: US 8,341,604 B2
(45) Date of Patent: Dec. 25, 2012

(54) EMBEDDED TRACE MACROCELL FOR ENHANCED DIGITAL SIGNAL PROCESSOR DEBUGGING OPERATIONS

(75) Inventors: Lucian Codrescu, Austin, TX (US);
William C. Anderson, Austin, TX (US);
Suresh Venkumahanti, Austin, TX (US); Louis Achille Giannini, Berwyn, IL (US); Manojkumar Pyla, San Diego, CA (US); Xufeng Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1152 days.

(21) Appl. No.: 11/560,339

(22) Filed: Nov. 15, 2006

(65) Prior Publication Data

US 2008/0115115 A1   May 15, 2008

(51) Int. Cl.
*G06F 9/44* (2006.01)
(52) U.S. Cl. ......... 717/129; 717/124; 717/125; 717/128
(58) Field of Classification Search ........................ None
See application file for complete search history.

(56) References Cited

U.S. PATENT DOCUMENTS

| | | | |
|---|---|---|---|
| 4,080,650 A | 3/1978 | Beckett |
| 4,669,059 A | 5/1987 | Little et al. |
| 4,901,307 A | 2/1990 | Gilhousen et al. |
| 5,093,914 A | 3/1992 | Coplien et al. |
| 5,103,459 A | 4/1992 | Gilhousen et al. |
| 5,136,717 A | 8/1992 | Morley et al. |
| 5,544,311 A | 8/1996 | Harenberg et al. |
| 5,551,043 A | 8/1996 | Crump et al. |
| 5,944,841 A | 8/1999 | Christie |
| 5,951,696 A | 9/1999 | Naaseh et al. |
| 6,018,759 A | 1/2000 | Doing et al. |

(Continued)

FOREIGN PATENT DOCUMENTS

EP    1411434 A2    4/2004

(Continued)

OTHER PUBLICATIONS

ARM Limited, Embedded Trace Macrocell 9—Technical Reference Manual, 2002, 164 pages, <http://rtds.cs.tamu.edu/web_462/techdocs/ARM/debug/DDI0157F_ETM9_r2p2.pdf>.*

(Continued)

*Primary Examiner* — Thuy Dao
(74) *Attorney, Agent, or Firm* — Peter Michael Kamarchik; Nicholas J. Pauley; Jonathan T. Velasco

(57) ABSTRACT

Techniques for the design and use of a digital signal processor, including (but not limited to) for processing transmissions in a communications (e.g., CDMA) system. The method and system improve software instruction debugging operations by capturing real-time information relating to software execution flow and include and instructions and circuitry for operating a core processor process within a core processor. A non-intrusive debugging process operates within a debugging mechanism of a digital signal processor. Non-intrusively monitoring in real time predetermined aspects of software execution occurs with the core processing process and occurs in real-time on the processor. An embedded trace macrocell records selectable aspects of the non-intrusively monitored software execution and generates at least one breakpoint in response to events arising within the selectable aspects of the non-intrusively monitored software execution. The present disclosure controls aspects of the non-intrusive debugging process in response to at least one breakpoint.

37 Claims, 13 Drawing Sheets

U.S. PATENT DOCUMENTS

| | | |
|---|---|---|
| 6,029,248 A | 2/2000 | Clee et al. |
| 6,052,708 A | 4/2000 | Flynn et al. |
| 6,067,588 A | 5/2000 | Ito |
| 6,106,571 A | 8/2000 | Maxwell |
| 6,199,181 B1 | 3/2001 | Rechef et al. |
| 6,202,172 B1 | 3/2001 | Ponte |
| 6,212,544 B1 | 4/2001 | Borkenhagen et al. |
| 6,226,749 B1 | 5/2001 | Carloganu et al. |
| 6,249,907 B1 | 6/2001 | Carter et al. |
| 6,314,530 B1 | 11/2001 | Mann |
| 6,341,347 B1 | 1/2002 | Joy et al. |
| 6,343,371 B1 | 1/2002 | Flanagan et al. |
| 6,467,054 B1 | 10/2002 | Lenny |
| 6,480,818 B1 | 11/2002 | Alverson et al. |
| 6,532,553 B1 | 3/2003 | Gwilt et al. |
| 6,567,839 B1 | 5/2003 | Borkenhagen et al. |
| 6,665,802 B1 | 12/2003 | Ober |
| 6,684,348 B1 | 1/2004 | Edwards et al. |
| 6,697,935 B1 | 2/2004 | Borkenhagen et al. |
| 6,708,270 B1 | 3/2004 | Mayer |
| 6,714,958 B1 | 3/2004 | Tudor |
| 6,757,829 B1 | 6/2004 | Laczko, et al. |
| 6,798,713 B1 | 9/2004 | Yearsley et al. |
| 6,832,334 B2 | 12/2004 | Wojcieszak et al. |
| 6,834,360 B2 | 12/2004 | Corti et al. |
| 6,915,416 B2 | 7/2005 | Deng et al. |
| 6,981,261 B2 | 12/2005 | Kalafatis et al. |
| 7,013,400 B2 | 3/2006 | Kalla et al. |
| 7,020,871 B2 | 3/2006 | Bernstein et al. |
| 7,047,451 B2 | 5/2006 | Agarwala et al. |
| 7,055,139 B2 * | 5/2006 | Balle et al. ............... 717/128 |
| 7,073,059 B2 | 7/2006 | Worely, et al. |
| 7,076,804 B2 | 7/2006 | Kershenbaum et al. |
| 7,080,289 B2 | 7/2006 | Swaine et al. |
| 7,093,236 B2 | 8/2006 | Swaine et al. |
| 7,131,114 B2 | 10/2006 | Nguyen et al. |
| 7,185,319 B2 * | 2/2007 | Kaler et al. ............... 717/124 |
| 7,203,926 B2 * | 4/2007 | Bogle et al. ............... 717/124 |
| 7,210,064 B2 | 4/2007 | Mayer |
| 7,213,134 B2 | 5/2007 | Soltis, Jr. |
| 7,222,262 B2 | 5/2007 | Prasadh et al. |
| 7,254,716 B1 | 8/2007 | Giles et al. |
| 7,278,058 B1 | 10/2007 | Narisi |
| 7,318,017 B2 | 1/2008 | Swoboda |
| 7,321,957 B2 | 1/2008 | Khan et al. |
| 7,360,117 B1 | 4/2008 | Boike et al. |
| 7,369,954 B2 | 5/2008 | Levine et al. |
| 7,370,210 B2 | 5/2008 | Symes |
| 7,380,112 B2 | 5/2008 | Okabayashi et al. |
| 7,380,276 B2 | 5/2008 | Saha et al. |
| 7,383,537 B2 | 6/2008 | Darweesh et al. |
| 7,383,540 B2 | 6/2008 | Kalra |
| 7,421,571 B2 | 9/2008 | Shoemaker |
| 7,437,619 B2 | 10/2008 | McCullough et al. |
| 7,461,407 B2 | 12/2008 | Little et al. |
| 7,472,378 B2 * | 12/2008 | Bennett et al. ............... 717/129 |
| 7,475,303 B1 * | 1/2009 | Edgar et al. ............... 714/724 |
| 7,512,954 B2 | 3/2009 | Srivastava et al. |
| 7,577,878 B2 | 8/2009 | Baradie et al. |
| 7,594,146 B2 | 9/2009 | Horikawa et al. |
| 7,600,221 B1 | 10/2009 | Rangachari |
| 7,657,791 B2 | 2/2010 | Codrescu et al. |
| 7,657,875 B2 | 2/2010 | Alexander, III et al. |
| 7,770,155 B2 | 8/2010 | Bates et al. |
| 7,770,156 B2 * | 8/2010 | Thekkath ............... 717/128 |
| 7,823,131 B2 * | 10/2010 | Gard et al. ............... 717/125 |
| 7,890,316 B2 | 2/2011 | Swoboda et al. |
| 7,917,907 B2 | 3/2011 | Ahmed et al. |
| 8,136,097 B2 * | 3/2012 | Konishi et al. ............... 717/129 |
| 8,185,879 B2 * | 5/2012 | Thekkath et al. ............... 717/128 |
| 8,196,109 B2 * | 6/2012 | Fung et al. ............... 717/125 |
| 8,239,838 B2 * | 8/2012 | Yim et al. ............... 717/129 |
| 2002/0004933 A1 * | 1/2002 | Dzoba et al. ............... 717/4 |
| 2002/0035721 A1 * | 3/2002 | Swoboda ............... 717/4 |
| 2002/0065646 A1 | 5/2002 | Waldie et al. |
| 2002/0099977 A1 * | 7/2002 | Wong ............... 714/28 |
| 2003/0014643 A1 | 1/2003 | Asami et al. |
| 2003/0014736 A1 * | 1/2003 | Nguyen et al. ............... 717/129 |
| 2003/0037226 A1 | 2/2003 | Tsuruta et al. |
| 2003/0061550 A1 | 3/2003 | Ng et al. |
| 2003/0065963 A1 | 4/2003 | Gregg |
| 2003/0074650 A1 * | 4/2003 | Akgul et al. ............... 717/129 |
| 2003/0135720 A1 | 7/2003 | DeWitt, Jr. et al. |
| 2004/0024995 A1 | 2/2004 | Swaine |
| 2004/0103397 A1 | 5/2004 | Agarwala et al. |
| 2004/0103398 A1 | 5/2004 | Agarwala et al. |
| 2004/0117768 A1 | 6/2004 | Chang et al. |
| 2004/0123274 A1 | 6/2004 | Inagaki et al. |
| 2004/0133823 A1 | 7/2004 | Swoboda et al. |
| 2004/0170046 A1 | 9/2004 | Belnet et al. |
| 2004/0170168 A1 | 9/2004 | Dedek |
| 2004/0177269 A1 | 9/2004 | Belnet et al. |
| 2004/0260910 A1 | 12/2004 | Watt et al. |
| 2005/0034024 A1 | 2/2005 | Alverson et al. |
| 2005/0108689 A1 | 5/2005 | Hooper et al. |
| 2005/0177703 A1 | 8/2005 | Norden et al. |
| 2005/0177819 A1 | 8/2005 | Ober et al. |
| 2005/0188358 A1 * | 8/2005 | Johnson et al. ............... 717/129 |
| 2005/0246691 A1 | 11/2005 | Hsieh et al. |
| 2005/0268168 A1 | 12/2005 | Ishihara |
| 2006/0026594 A1 | 2/2006 | Yoshida et al. |
| 2006/0048099 A1 | 3/2006 | Templin et al. |
| 2006/0069953 A1 * | 3/2006 | Lippett et al. ............... 714/25 |
| 2006/0129999 A1 | 6/2006 | Hiraoka et al. |
| 2006/0179281 A1 | 8/2006 | Jensen et al. |
| 2006/0184835 A1 | 8/2006 | Al-Omari et al. |
| 2006/0206902 A1 | 9/2006 | Jamil et al. |
| 2006/0212759 A1 | 9/2006 | Campbell et al. |
| 2006/0248394 A1 | 11/2006 | McGowan |
| 2006/0248395 A1 | 11/2006 | McGowan |
| 2006/0248401 A1 | 11/2006 | Carroll et al. |
| 2006/0253894 A1 | 11/2006 | Bookman et al. |
| 2006/0259831 A1 | 11/2006 | Sohm et al. |
| 2006/0279439 A1 | 12/2006 | Swoboda |
| 2006/0282419 A1 | 12/2006 | Sen et al. |
| 2006/0282734 A1 | 12/2006 | Milne et al. |
| 2007/0016959 A1 | 1/2007 | Ikeda et al. |
| 2007/0043861 A1 | 2/2007 | Baron et al. |
| 2007/0089095 A1 | 4/2007 | Thekkath et al. |
| 2007/0180333 A1 | 8/2007 | Thekkath et al. |
| 2007/0180431 A1 | 8/2007 | Agarwala et al. |
| 2007/0220360 A1 | 9/2007 | Weinert et al. |
| 2007/0234306 A1 | 10/2007 | Klinger et al. |
| 2007/0240125 A1 * | 10/2007 | Degenhardt et al. ............... 717/129 |
| 2007/0271461 A1 | 11/2007 | Hardy et al. |
| 2007/0288906 A1 | 12/2007 | Agarwala et al. |
| 2008/0010640 A1 | 1/2008 | Foo |
| 2008/0027961 A1 | 1/2008 | Arlitt et al. |
| 2008/0028196 A1 | 1/2008 | Kailas |
| 2008/0034350 A1 * | 2/2008 | Conti ............... 717/124 |
| 2008/0052681 A1 | 2/2008 | Yang |
| 2008/0059963 A1 | 3/2008 | Foo |
| 2008/0080651 A1 | 4/2008 | Edgar |
| 2008/0098207 A1 | 4/2008 | Reid et al. |
| 2008/0114972 A1 | 5/2008 | Codrescu et al. |
| 2008/0115011 A1 | 5/2008 | Codrescu et al. |
| 2008/0115113 A1 | 5/2008 | Codrescu et al. |
| 2008/0209176 A1 | 8/2008 | Singh et al. |
| 2008/0256339 A1 | 10/2008 | Xu et al. |
| 2008/0256396 A1 | 10/2008 | Giannini et al. |
| 2008/0288808 A1 | 11/2008 | Moyer |
| 2009/0007076 A1 | 1/2009 | Al-Omari et al. |
| 2009/0132863 A1 | 5/2009 | Ashfield et al. |
| 2009/0199162 A1 | 8/2009 | Choi et al. |

FOREIGN PATENT DOCUMENTS

| | | |
|---|---|---|
| JP | 2183362 A | 7/1990 |
| JP | 04145544 | 5/1992 |
| JP | 8055023 A | 2/1996 |
| JP | 8087366 A | 4/1996 |
| JP | 9167105 A | 6/1997 |
| JP | 2001154873 A | 6/2001 |
| JP | 2001519947 A | 10/2001 |
| JP | 2001331340 A | 11/2001 |
| JP | 2001521215 T | 11/2001 |
| JP | 2003177938 A | 6/2003 |
| JP | 2004171563 A | 6/2004 |

| | | |
|---|---|---|
| JP | 2004171564 A | 6/2004 |
| JP | 2006285430 A | 10/2006 |
| KR | 20010031167 | 4/2001 |
| KR | 20060049710 | 5/2006 |
| TW | 200625070 | 7/2006 |
| WO | WO9921089 | 4/1999 |
| WO | WO0068780 | 11/2000 |
| WO | 01018651 | 3/2001 |
| WO | WO2006030195 | 3/2006 |

OTHER PUBLICATIONS

Mayer et al., Debug support, Clibration and Emulation for Multiple Processor and Powertrain Control SoCs, 2005, 5 pages, <http://ieeexplore.ieee.org/stamp/stamp.jsp?arnumber=01395811>.*

Compan et al., GENVIEW: A Portable Source-Level Debugger for MacroCell Generators, 1991, 5 pages, <http://ieeexplore.ieee.org/stamp/stamp.jsp?tp=&arnumber=206436&userType=inst>.*

Vermeulen et al., Automatic generation of breakpoint hardware for silicon debug, Jun. 2004, 4 pages, <http://delivery.acm.org/10.1145/1000000/996708/p514-vermeulen.pdf>.*

Camera et al., An integrated debugging environment for reprogrammble hardware systems, Sep. 2005, 5 pages, <http://delivery.acm.org/10.1145/1090000/1085145/p111-camera.pdf>.*

Hartvigsen, J., et al.; "Juag/Debug Interface"; Motorola Technical Developments, Motorola Inc., Schaumburg, Illinois, US; vol. 19, Jun. 1, 1993; pp. 107-109.

International Search Report-PCT/US07/084578, International Search Authority-European Patent Office-Oct. 7, 2008.

Written Opinion-PCT/US07/084578, International Search Authority-European Patent Office-Oct. 7, 2008.

"Processor-Controlled Battery Back-Up Power Supply Architecture" IBM Technical Disclosure Bulletin, IBM Corp. New York, US, vol. 31, No. 3, (Aug. 1, 1988), pp. 183-185, XP000119002, ISSN: 0018-8689.

"Technique for Power Management in Signal Processors" IBM Technical Disclosure Bulletin, IBM Corp. New York, US, vol. 35, No. 5, (Oct. 1, 1992), pp. 425-427, XP000313036.

ETSI TS 125 305 v6.1.0, "Universal Mobile Telecommunications Systems (UMTS)", European Telecommunications Standard Institute, Sophia-Antipo, FR, vol. 3-R2, Jun. 2004, XP014016761.

Qian, Y. et al.; "Cycle accurate thread timer for linux environment" Performance Analysis of Systems and Software, 2001, ISPASS. 2001 IEEE International Symposium on Nov. 4-6, 2001, Piscataway, NJ, USA,IEEE, Nov. 4, 2001, pp. 38-44, XPOI0583886 ISBN: 978-0-7695-7230-7 * abstract ** p. 40, left-hand column, line 5-line *13 * p. 42, left-hand column, line 10-line 23 *.

Wu, C. et al.: "Trace-based analysis and tuning for distributed parallel applications" Parallel and Distributed Systems, 1994. International Conference on.

Hsinchu, Taiwan Dec. 19-21, 1994, Los Alamitos, CA, USA, IEEE, Comput. Soc, Dec. 19, 1994, pp. 716-723, XPOI0223604 ISBN: 978-0-8186-6555-4.

Microsoft Press Computer Dictionary, Third Edition, "operating system," Microsoft Press (Aug. 1, 1997), ISBN 1-57231-446-X, p. 341.*

Jiang, "Enhancing System-on-Chip Verification Using Embedded Test Structures", Dec. 2005, pp. 1-61.

Vermeulen et al., "Core-Based Scan Architecture for Silicon Debug", IEEE, 2002, pp. 638-647.

Andrews et al, "Xbox 360 system Architecture", 2006.

Blair Fort, et al., "A Multithreaded Soft Processor for SOPC Area Reduction", IEEE International Symposium on Custom Computing Machines, Napa, CA, Oct. 2006, IEEE computer society, pp. 131-142.

Kreuzinger J, et al: "Context-Switching Techniques for Decoupled Multithreaded Processors" Euromicroconference, 1999, Proceedings. 25th Milan, Italy Sep. 8-10, 1999, Los Alamitos, CA, USA, IEEE Comput, Soc, US, vol. 1, (Sep. 8, 1999), pp. 248-251.

Rootselaar et al., "Debugging of system-on-a-chip",1997.

Ungerer Theo, "A Survey of Processors With Explicit Multithreading, Mar. 2003 (29-63)," ACM Computing Survey, 2003, 35 (1).

Vermeulen et al., "Silicon Debug of a Co-processor Array for Video Applications", 2000.

* cited by examiner

| DISABLED | TRIGGER(i) OR TRIGGER(j) |
|---|---|
| TRIGGER(i) | TRIGGER(i) OR NOT TRIGGER(j) |
| NOT TRIGGER(i) | NOT TRIGGER(i) OR TRIGGER(j) |
| TRIGGER(i) AND TRIGGER(j) | NOT TRIGGER(i) OR NOT TRIGGER(j) |
| TRIGGER(i) AND NOT TRIGGER(j) NOT TRIGGER(i) AND TRIGGER(j) | EXTERNAL-EVENT-SOURCE TRIGGER(0) AND TRIGGER(1) AND TRIGGER(2) AND TRIGGER(3) |
| NOT TRIGGER(i) AND NOT TRIGGER(j) | TRIGGER(0) OR TRIGGER(1) OR TRIGGER(2) OR TRIGGER(3) |

FIG. 12

| REGISTER NAME | REGISTER DESCRIPTION |
| --- | --- |
| ETM_VERSION | VERSION IDENTIFIER |
| ETM_CLK_EN | CLOCK ENABLE |
| ETM_CTRL | OVERALL ETM CONFIGURATION |
| ETM_RESET | RESET CONTROL |
| SYNC_PERIOD | SYNCH PACKET GENERATION FREQUENCY |
| TRIG0_CTRL0 | TRIGGER BLOCK CONTROL |
| TRIG0_CTRL1 | TRIGGER BLOCK CONTROL |
| TRIG0_COUNT | TRIGGER COUNTER |
| TRIG0_SAC0_ADDR | SAC REFERENCE ADDRESS |
| TRIG0_SAC1_ADDR | SAC REFERENCE ADDRESS |
| TRIG0_DC_MASK | DC MASK |
| TRIG0_DC_DATA | DC REFERENCE DATA |
| TRIG1_CTRL0 | TRIGGER BLOCK CONTROL |
| TRIG1_CTRL1 | TRIGGER BLOCK CONTROL |
| TRIG1_CCOUNT | TRIGGER COUNTER |
| TRIG1_SAC0_ADDR | SAC REFERENCE ADDRESS |
| TRIG1_SAC1_ADDR | SAC REFERENCE ADDRESS |
| TRIG1_DC_MASK | DC MASK |
| TRIG1_DC_DATA | DC REFERENCE DATA |
| TRIG2_CTRL0 | TRIGGER BLOCK CONTROL |
| TRIG2_CTRL1 | TRIGGER BLOCK CONTROL |
| TRIG2_COUNT | TRIGGER COUNTER |
| TRIG2_SAC0_ADDR | SAC REFERENCE ADDRESS |
| TRIG2_SAC1_ADDR | SAC REFERENCE ADDRESS |
| TRIG2_DC_MASK | DC MASK |
| TRIG2_DC_DATA | DC REFERENCE DATA |
| TRIG3_CTRL0 | TRIGGER BLOCK CONTROL |
| TRIG3_CTRL1 | TRIGGER BLOCK CONTROL |
| TRIG3_COUNT | TRIGGER COUNTER |
| TRIG3_SAC0_ADDR | SAC REFERENCE ADDRESS |
| TRIG3_SAC1_ADDR | SAC REFERENCE ADDRESS |
| TRIG3_DC_MASK | DC MASK |
| TRIG3_DC_DATA | DC REFERENCE DATA |

FIG. 13

EMBEDDED TRACE MACROCELL FOR ENHANCED DIGITAL SIGNAL PROCESSOR DEBUGGING OPERATIONS

RELATED APPLICATIONS

This application is related to the following co-pending U.S. patent application Ser. No. 11/560,217, filed Nov. 15, 2006, entitled NON-INTRUSIVE, THREAD-SELECTIVE, DEBUGGING METHOD AND SYSTEM FOR A MULTI-THREAD DIGITAL SIGNAL PROCESSOR; U.S. patent application Ser. No. 11/560,323, filed Nov. 15, 2006, entitled METHOD AND SYSTEM FOR A DIGITAL SIGNAL PROCESSOR DEBUGGING DURING POWER TRANSITIONS; U.S. patent application Ser. No. 11/560,332, filed Nov. 15, 2006, entitled METHOD AND SYSTEM FOR TRUSTED/ENTRUSTED DIGITAL SIGNAL PROCESSOR DEBUGGING OPERATIONS; and U.S. patent application Ser. No. 11/560,344, filed Nov. 15, 2006, entitled METHOD AND SYSTEM FOR INSTRUCTION STUFFING OPERATIONS DURING NON-INTRUSIVE DIGITAL SIGNAL PROCESSOR DEBUGGING.

FIELD

The disclosed subject matter relates to data processing systems and processes, such as may find use in data communications and similar applications. More particularly, this disclosure relates to a novel and improved method and system for digital signal processing debugging operations, including providing and making use of an embedded trace macrocell for enhance debugging operations.

DESCRIPTION OF THE RELATED ART

Increasingly, telecommunications and other types of electronic equipment and supporting video, complex audio, videoconferencing and other rich software applications involve signal processing. Signal processing requires fast mathematical calculations and data generation in complex, but repetitive algorithms. Many applications require computations in real-time, i.e., the signal is a continuous function of time, which must be sampled and converted to digital signals for numerical processing. The processor must execute algorithms performing discrete computations on the samples as they arrive.

The architecture of a digital signal processor (DSP) is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communications, as well as text messaging and other applications, between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459 entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that may more efficiently transmit packet data is offered by a consortium named the "$3^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA Standard.

Complex DSP operational software employing the W-DCMA Standard, for example, requires robust development tools. Such development tools may include those for code generation, integration, testing, debugging, and evaluating application performance. In developing and operating software or complex DSP applications, such as advanced telecommunications applications, there is the need for sophisticated, yet non-intrusive debugging software. That is, debugging software applications must be not only sufficiently robust to monitor, test, and support the correction of software defects and operational problems, but also they may operate so as not to interfere with the core processor software during debugging operations. Otherwise, any problems in the core processing software may not be detected or detected properly during the use of such debugging software.

During debugging operations, there is a need for associating the non-intrusive software debugging process software executing tracing facilities for the associated processor. Such a system may provide information on the processor's state for permitting such information to be captured both before and after a specific event. At the same time, such features cannot adding any significant burden to the processor's performance, even while the DSP operates at full speed. In combination with a non-intrusive debugging operation, such a process may provide for configuration in software for capture select trace information, for example, after a specific sequence of conditions. Such a monitoring and recording mechanism may also operate in conjunction with the non-intrusive debugging process for thread-selectable operation in a multi-threaded processor for permitting various types of configuration and breakpoint determinations and permissions.

Yet a further need exists for a non-intrusive debugging system capable of capturing in real-time detailed information about the DSP's execution flow, and to do so in a non-intrusive manner.

A further need exists for a software execution monitoring and recording system for operation in conjunction with a non-intrusive debugging mechanism, which itself provides for the limitation and focusing of the generation of trace information to one or more regions of interest within the DSP core.

Still further, there is a need for a non-intrusive debugging system that may respond to the operation of a software execution and monitoring process and system. A need clearly exists for a way to initiate the debugging system itself upon the initiation or a transition in the operation of the software execution monitoring and recording system. Accordingly, such a feature may be provided by the associated non-intrusive debugging system for such close and operationally synergistic functioning with the software execution monitoring and recording system.

SUMMARY

Techniques for providing non-intrusive, thread-selective, debugging method and system for a digital signal processor, including a multi-threaded digital signal processor, are disclosed, which techniques cooperate with an embedded trace macrocell for initiating debugging operations in response to certain monitored events in core processor operations. The method and system here disclosed improve both the operation of a digital signal processor and the efficient use of digital signal processor instructions for increasingly powerful software applications, including applications operating in personal computers, personal digital assistants, wireless handsets, and similar electronic devices, as well as increasing the associated digital processor speed and service quality.

According to one aspect of the disclosed subject matter, a method and system are provided for improving software instruction debugging operations by capturing real-time information relating to software execution flow in a processor. The method and system include and instructions and circuitry for operating a core processor process within a core processor associated with the digital signal processor. The disclosed subject matter operates a non-intrusive debugging process within a debugging mechanism of the digital signal processor. Non-intrusively monitoring in real time predetermined aspects of software execution associated with the core processing process and occurring in real-time on the processor, using an embedded trace macrocell. The embedded trace macrocell records selectable aspects of the non-intrusively monitored software execution and generates at least one breakpoint in response to events arising within the selectable aspects of the non-intrusively monitored software execution. The present disclosure controls aspects of the non-intrusive debugging process in response to at least one breakpoint. As a result, the disclosed subject matter cooperates with the non-intrusive debugging process for multi-thread trace instruction sequencing and timing for up to all threads of a multi-threaded digital signal processor.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter may become more apparent from the detailed description set forth below when taken in conjunction with the drawings in which like reference characters identify correspondingly throughout and wherein.

Figure 3:
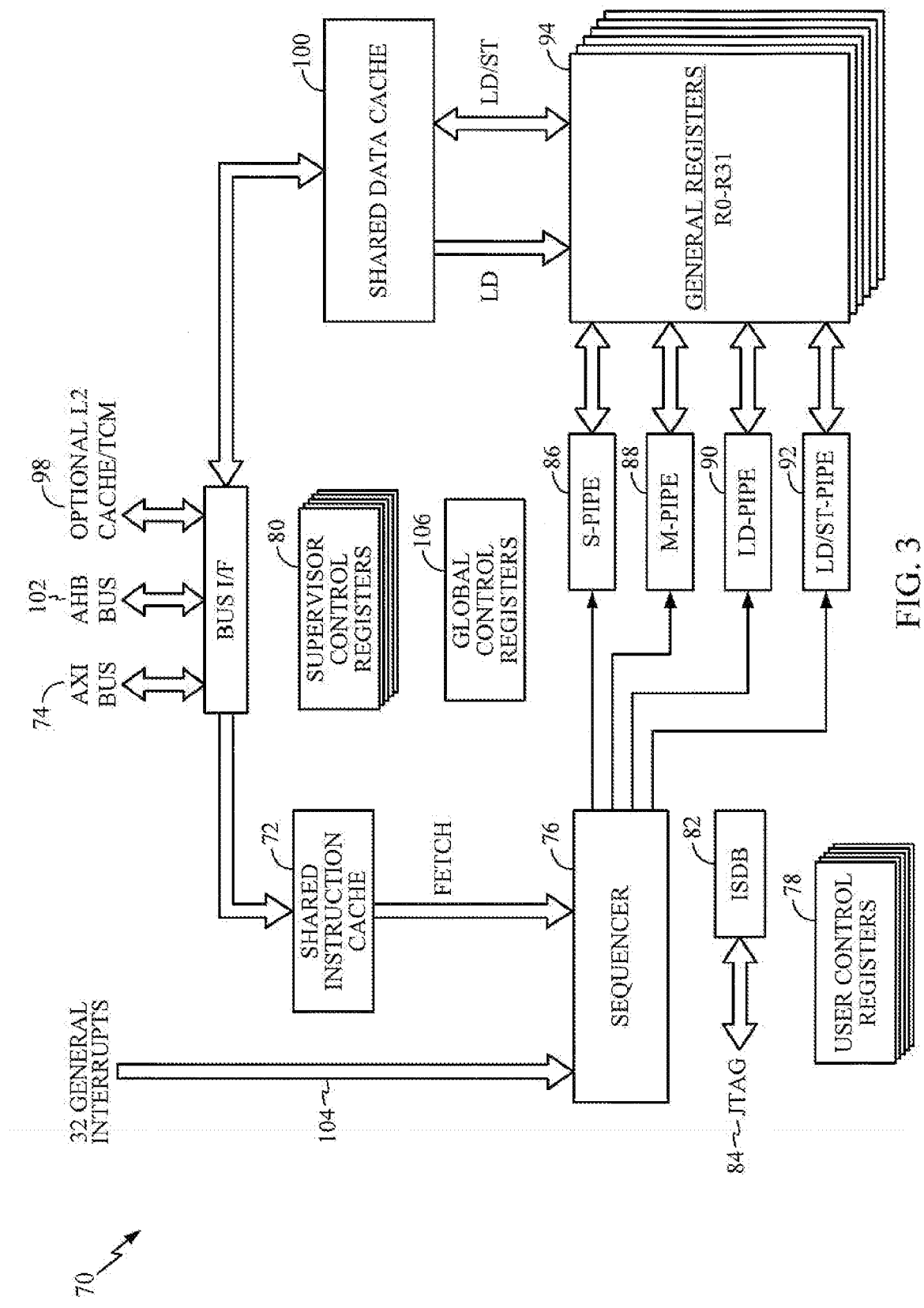
Figure 4:
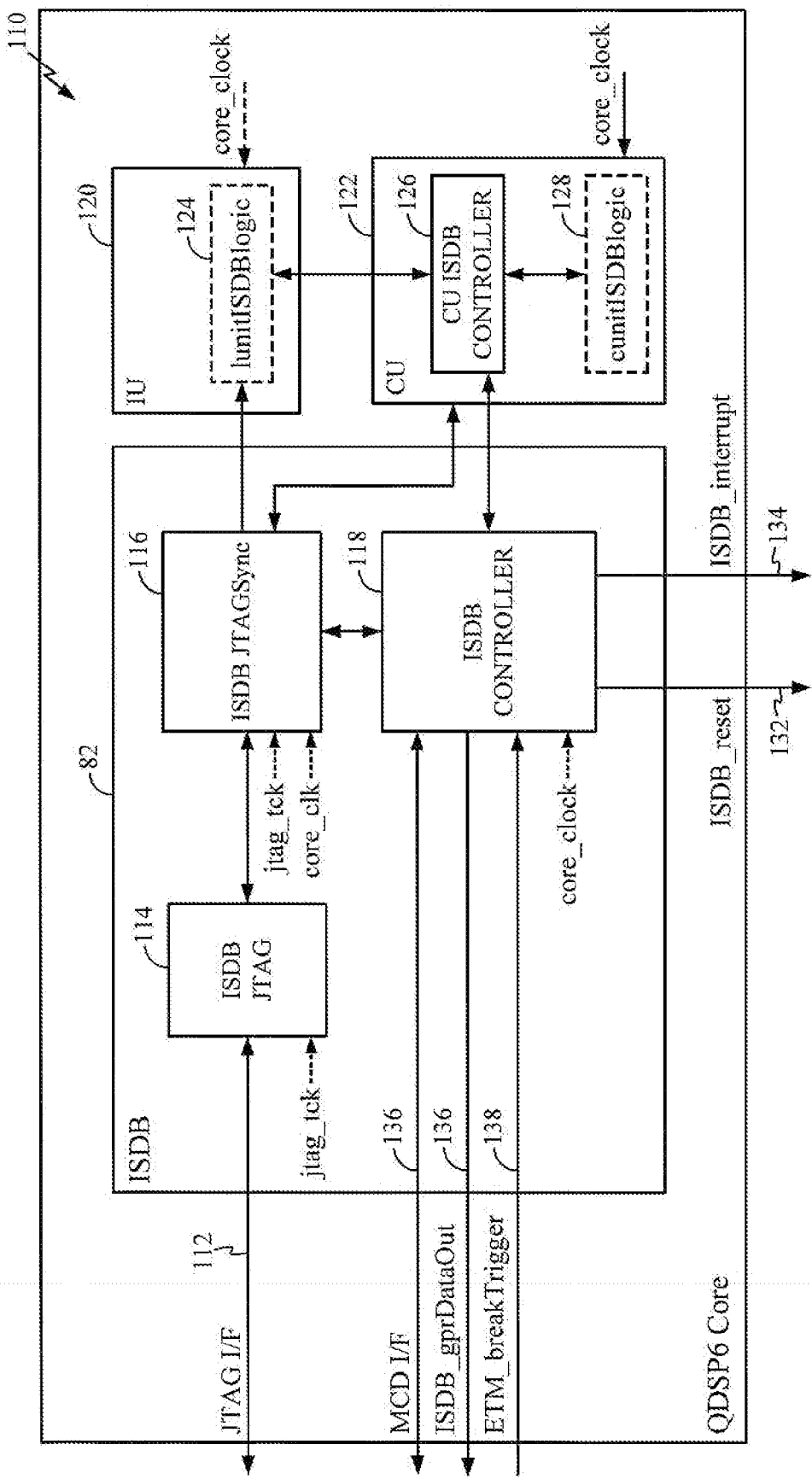
Figure 5:
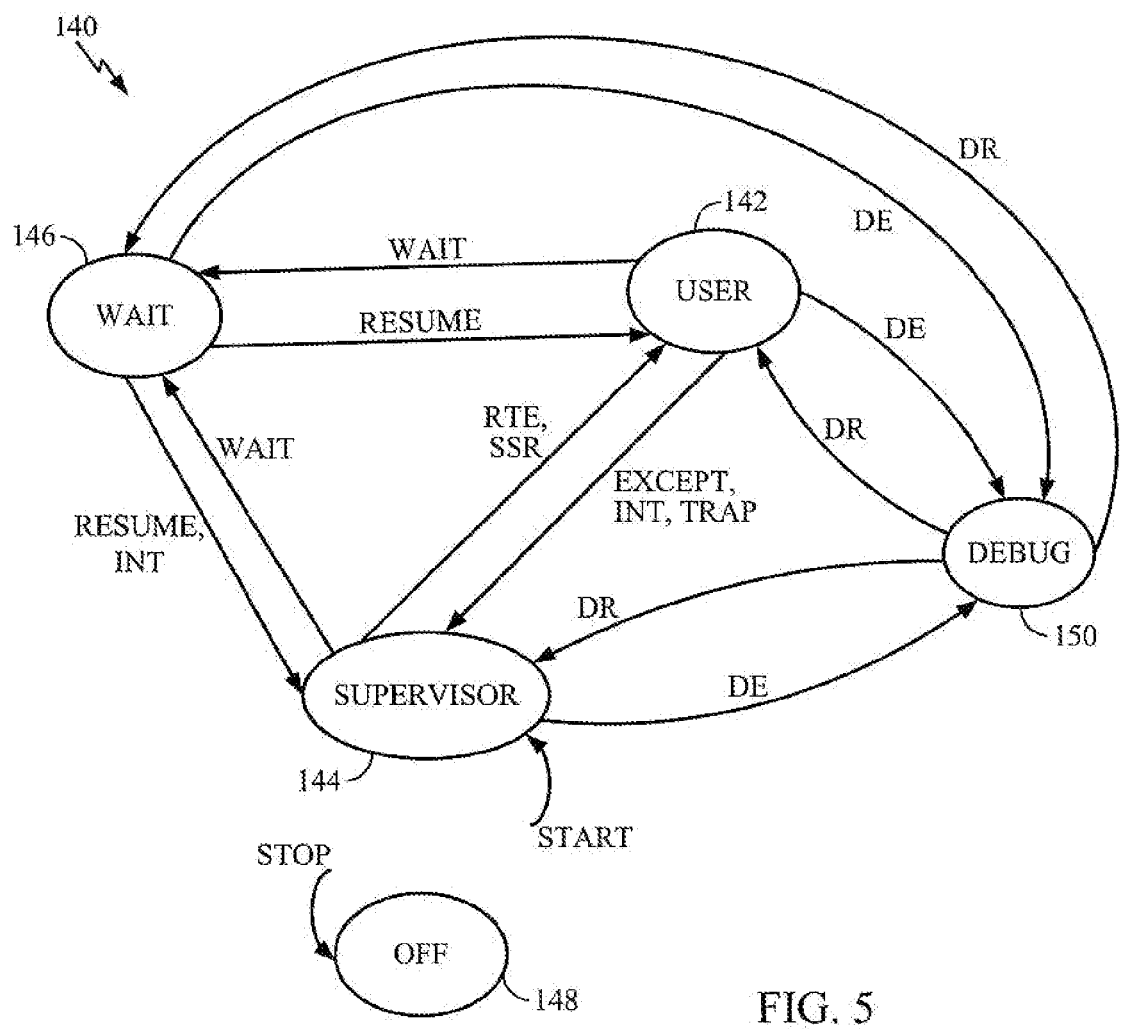
Figure 6:
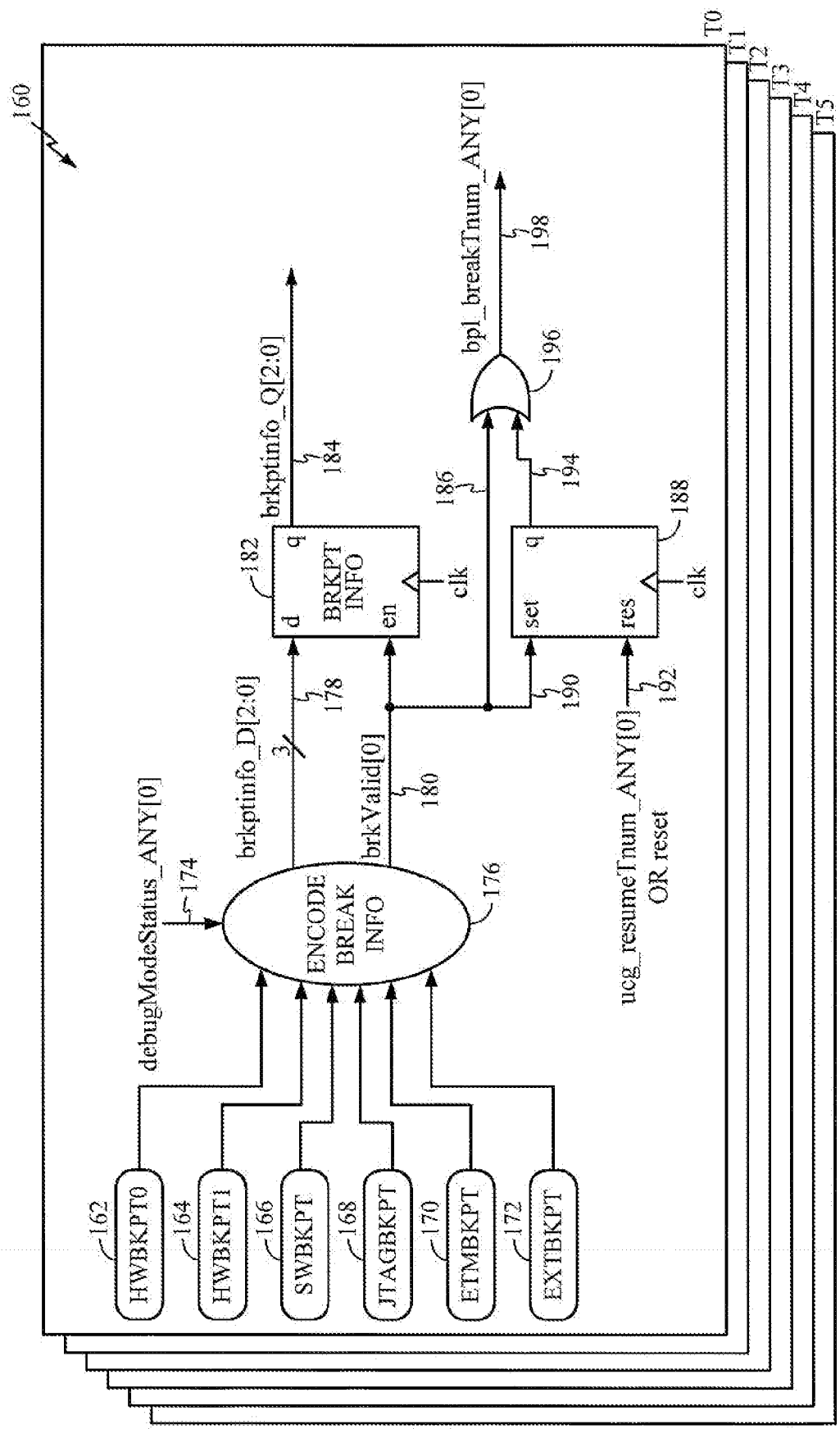
Figure 7:
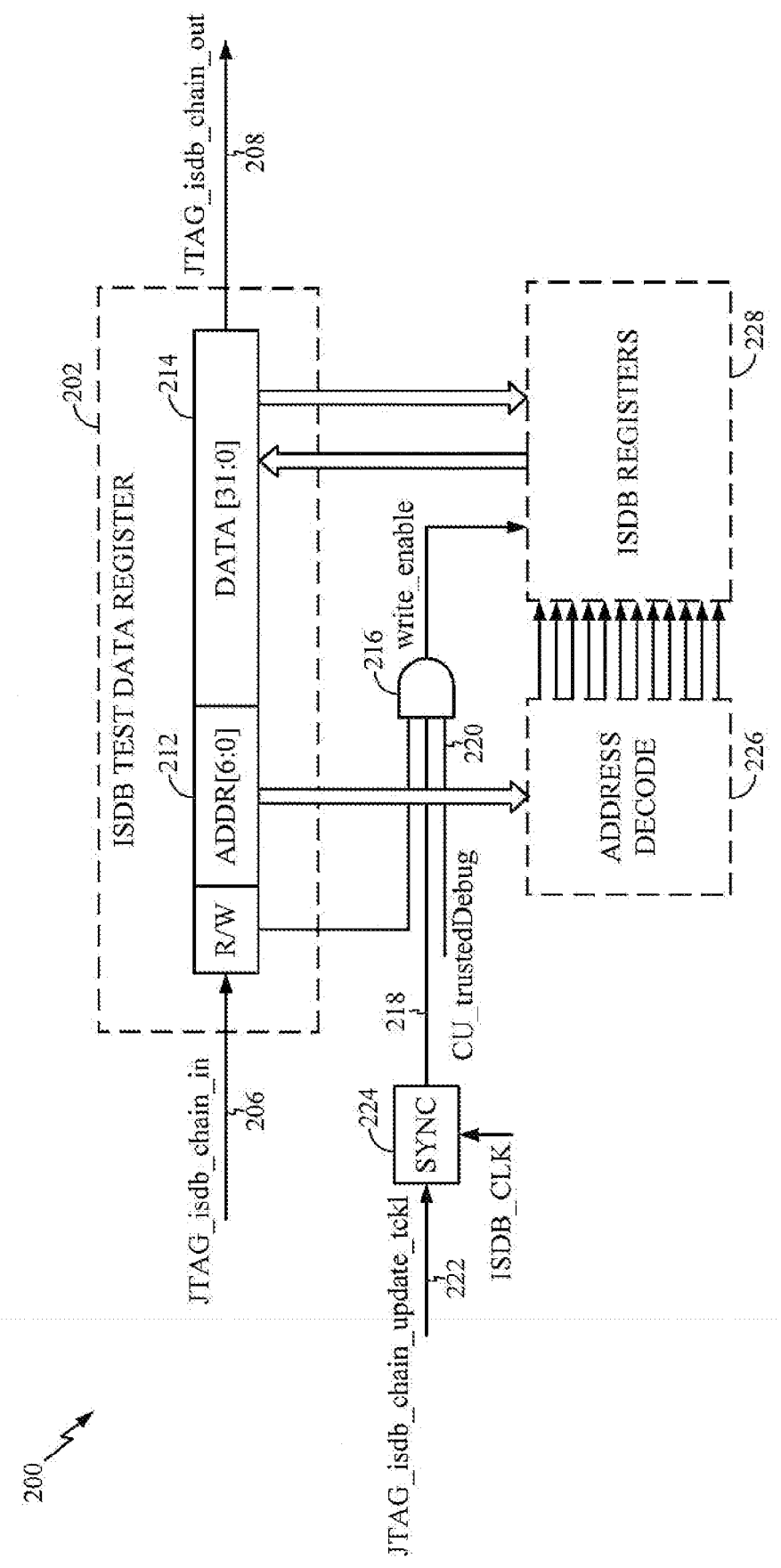
Figure 8:
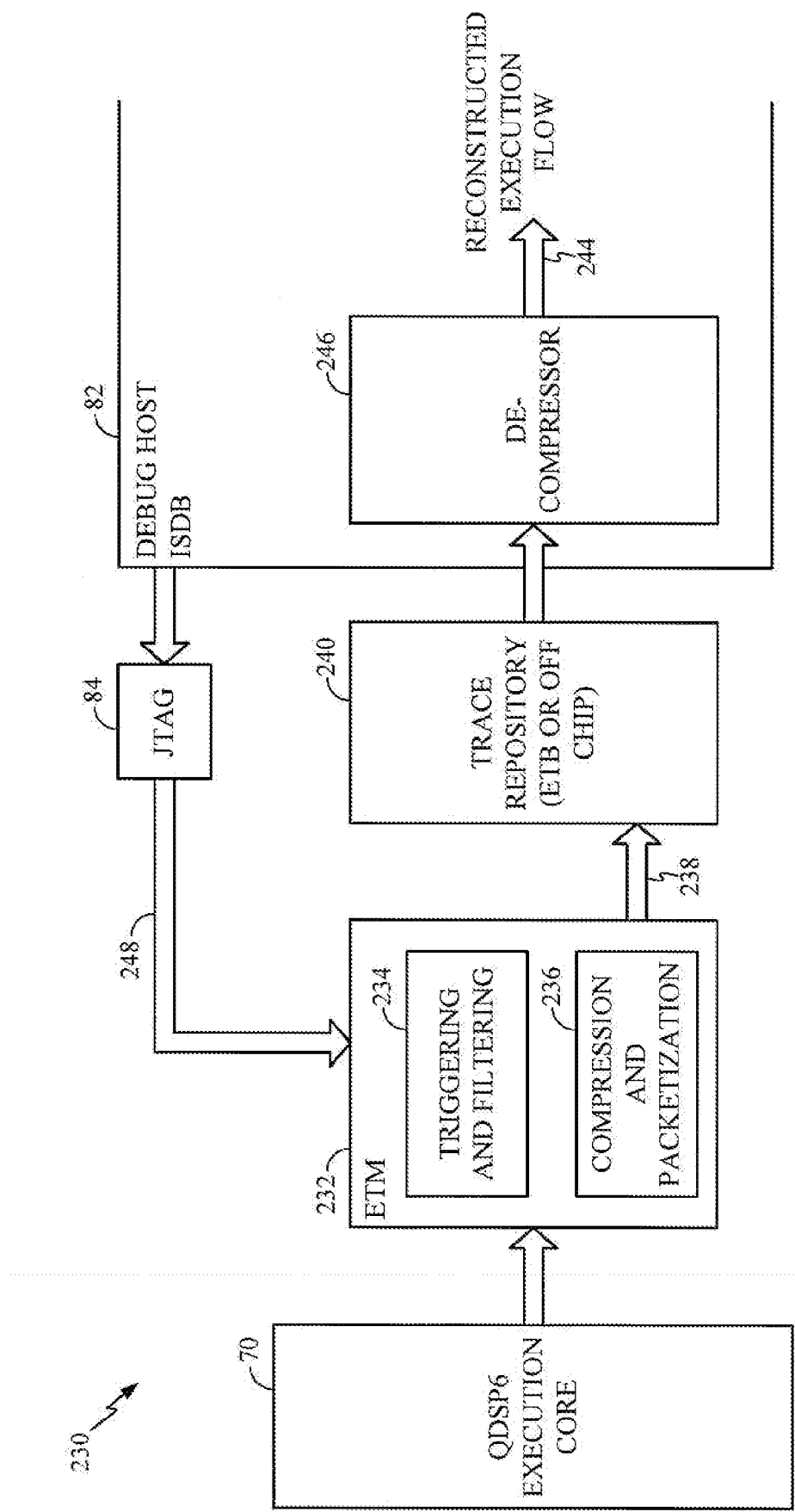
Figure 9:
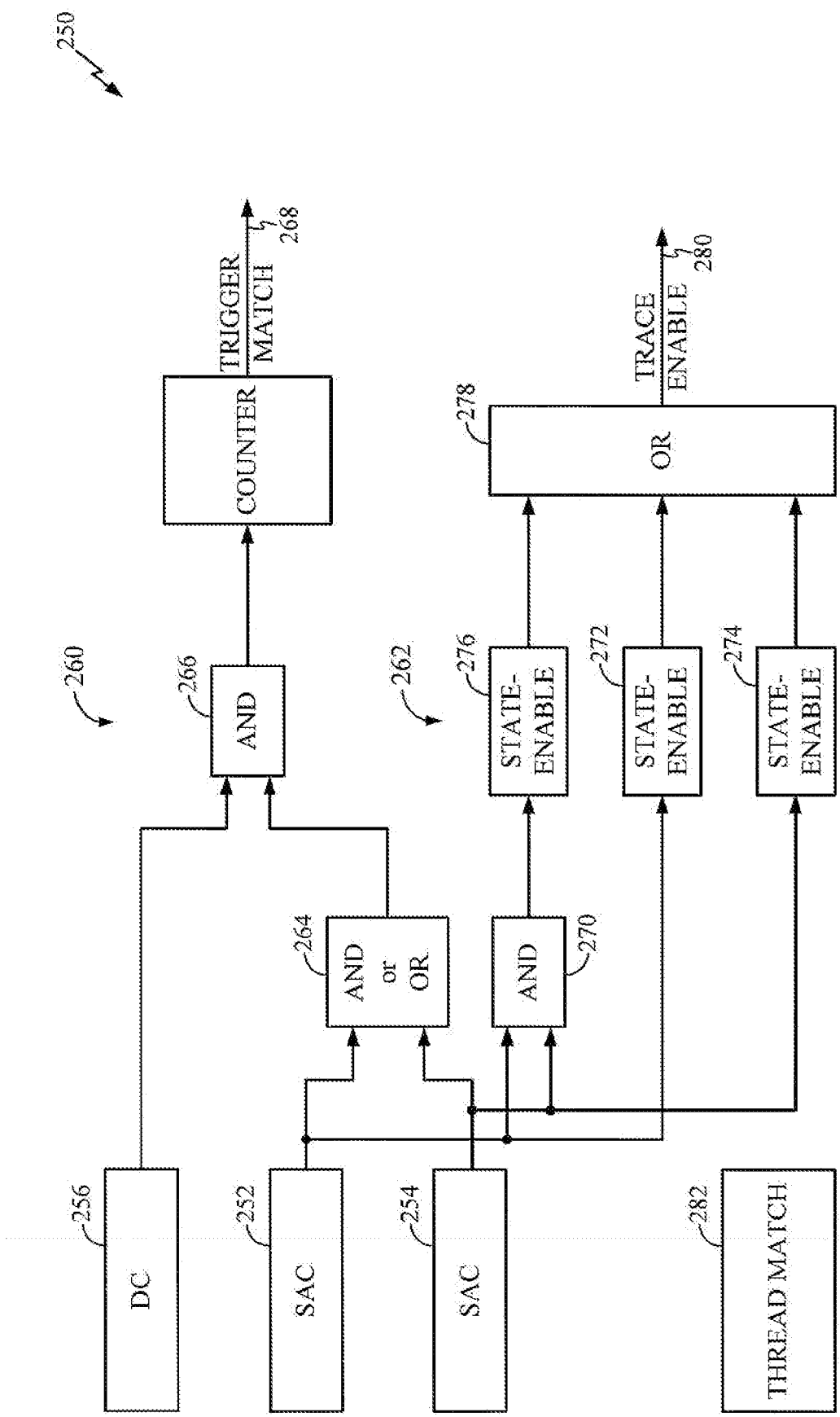
Figure 10:
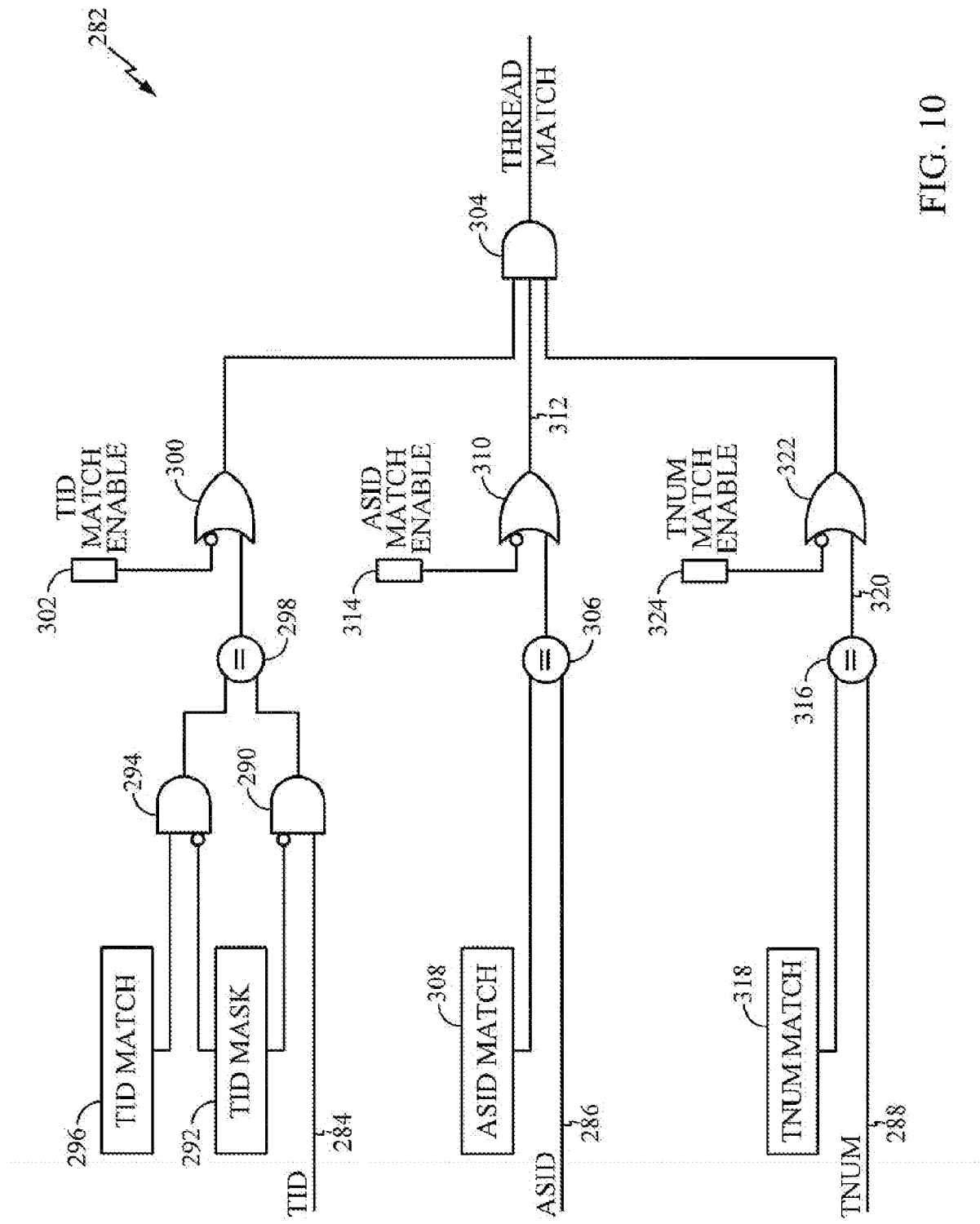
Figure 11:
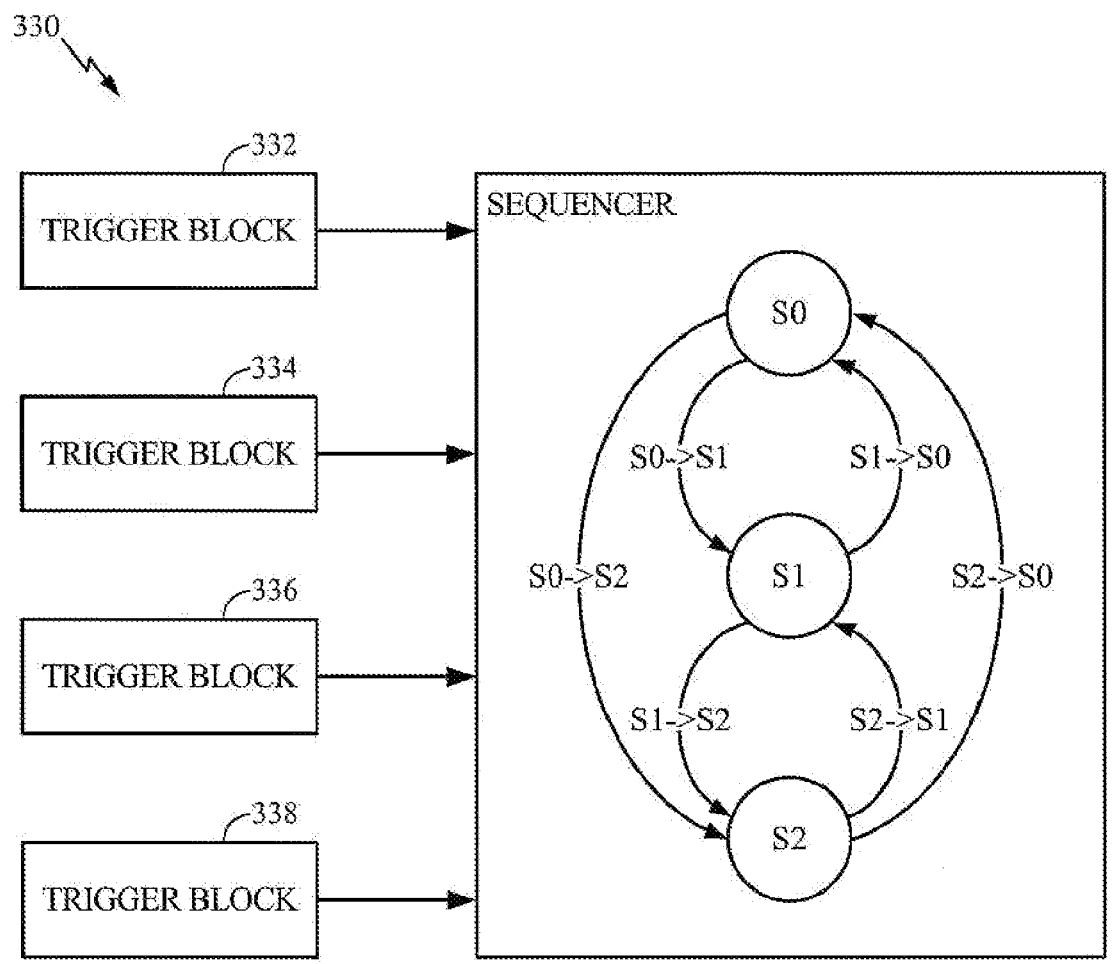

FIG. 3 provides an architecture block diagram of one embodiment of a multi-threaded digital signal processor incorporating the technical advantages of the presently disclosed subject matter;

FIG. 4 discloses certain aspects of a digital signal processor core applying the ISDB/JTAG interface features of the present disclosure;

FIG. 5 presents a process flow diagram applicable to the operating modes of the digital signal processor, including the debugging mode of operation to which the present disclosure pertains;

FIG. 6 depicts a breakpoint processing scheme applicable to one embodiment of the present disclosure;

FIG. 7 shows an aspect of an ISDB JTAGSync circuit for performing the debugging procedures here disclosed;

FIG. 8 provides block diagram depicting an overall functional view of the embedded trace macrocell of the present disclosure;

FIG. 9 shows a trigger block circuit of the disclosed embedded trace macrocell process and system;

FIG. 10 illustrates one embodiment of a thread matching circuit useful in the operation of the disclosed embedded trace macrocell;

FIG. 11 shows a sequencer and trigger block circuit operable in association with the present disclosure for performing a variety of tracing and sequencing functions; and FIGS. 12 and 13 provide tables of conditions and registers applicable to the sequencing and more complex operations of the present disclosure.

DETAILED DESCRIPTION OF THE SPECIFIC EMBODIMENTS

Figure 1:
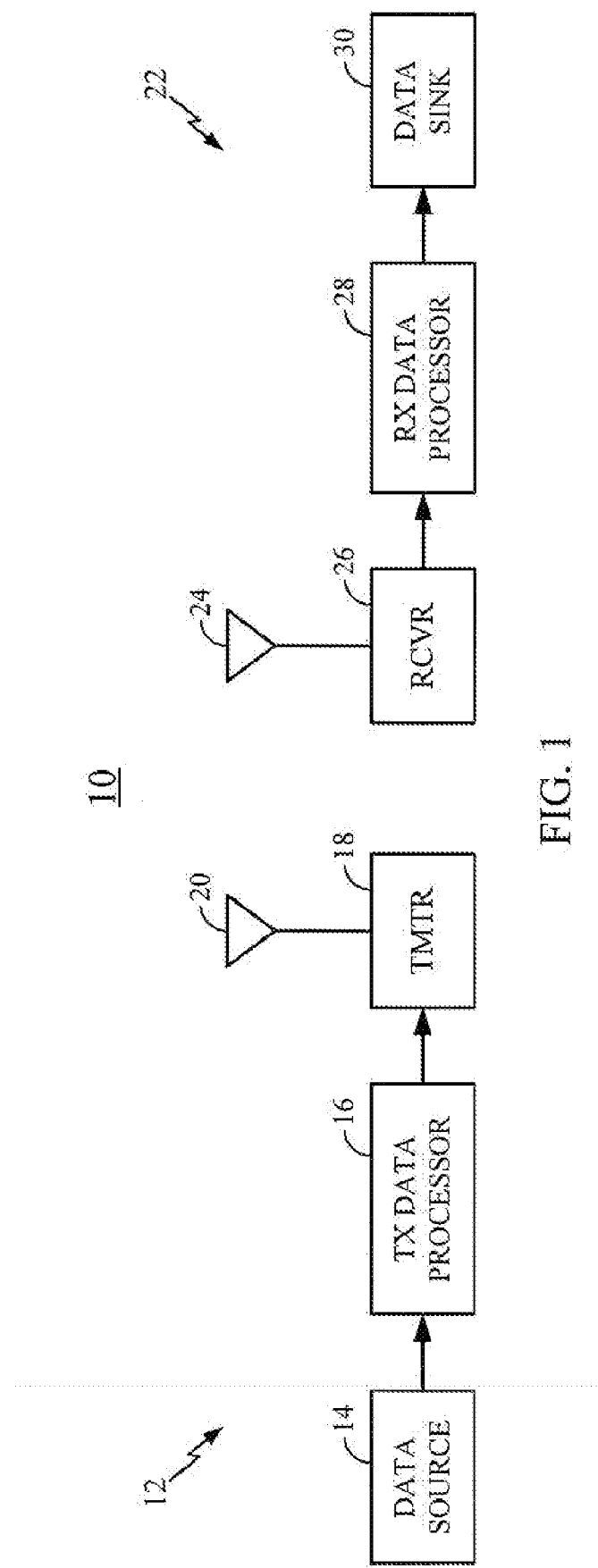
FIG. 1 is a simplified block diagram of a communications system that may implement one of the various embodiments here disclosed.

The disclosed subject matter for a non-intrusive, thread-selective, debugging method and system for a multi-threaded digital signal processor has application for multi-threaded processing of any type for which the benefits here presented may be advantageous. One such application appears in telecommunications and, in particular, in wireless handsets that employ one or more digital signal processing circuits. For explaining how such a wireless handset may be used, FIG. 1 provides a simplified block diagram of a communications system 10 that may implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 may be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA Standard.

Figure 2:
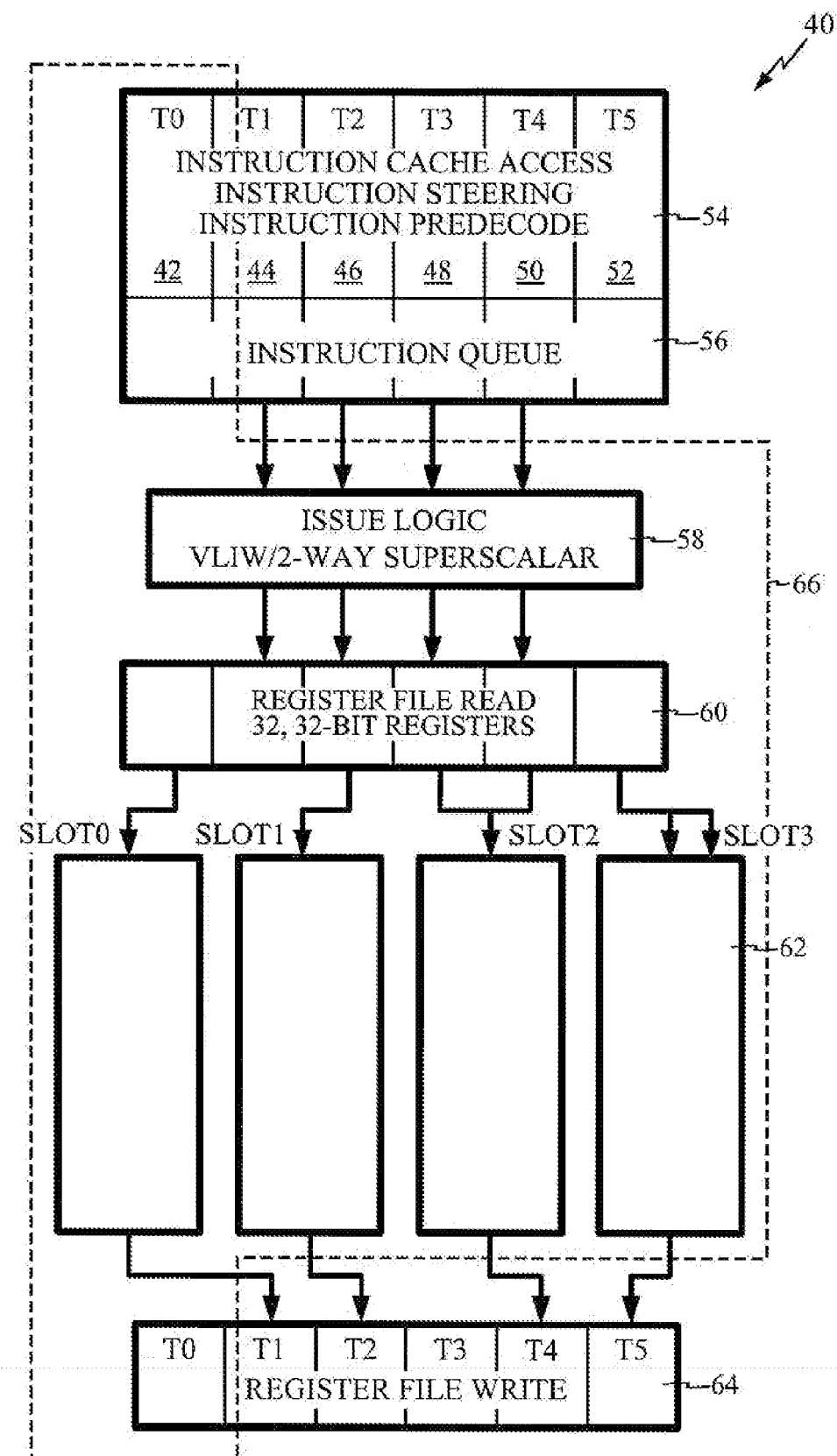
FIG. 2 illustrates a DSP architecture for carrying forth the teachings of the present disclosure.

FIG. 2 illustrates DSP 40 architecture that may serve as the transmit data processor 16 and receive data processor 28 of FIG. 1. We emphasize that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of a selected thread is read and read data is sent to execution data paths 62 for SLOT0:SLOT3. SLOT0:SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 forms a processing pipeline 66. The present embodiment may employ a hybrid of a heterogeneous element processor (HEP) system using a single processor with up to six threads, T0:T5. Processor pipeline 66 has six stages, which matches the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. patent applications by M. Ahmed, et al, and entitled "Variable Interleaved Multithreaded Processor Method and System" and "Method and System for Variable Thread Allocation and Switching in a Multithreaded Processor."

FIG. 3, in particular, provides a core processing architecture 70 block diagram for DSP 40 as applied to a single thread that may employ the teachings of the disclosed subject matter. Block diagram 70 depicts shared instruction cache 72 which receives instructions via Bus interface (I/F) 73 from AXI Bus 74, which instructions include mixed 16-bit and 32-bit instructions. These instructions reach to sequencer 76, user control register 78, and supervisor control register 80 of threads T0:T5. The core-level system architecture of the disclosed subject matter also includes in-silicon debugging system (ISDB) 82, which interfaces core processor 70 via JTAG interface 84, both of which are described in more detail below.

Sequencer 76 provides hybrid two-way superscalar instructions and four-way VLIW instructions to S-Pipe unit 86, M-Pipe unit 88, LD[Load]-Pipe 90, and LD/ST[Store]-Pipe unit 92, all of which communicate with general registers 94. AXI Bus 74 also communicates via Bus I/F 73 with shared data cache 96 LD/ST instructions to threads T0:T5. Optional L2 Cache/TCM 98 signals include LD/ST instructions with shared data TCM 100, which LD/ST instructions further flow to threads General Registers 94. From AHB peripheral bus 102 MSM specific controller 104 communicates interrupts with T0:T5, including interrupt controller instructions, debugging instructions, and timing instructions. Global control registers 106 communicates control register instructions with threads T0:T5.

DSP 40, therefore, includes six virtual DSP cores, each containing global control registers 106 and private supervisor control registers 80. Global control registers 106 are shared between all threads. Each thread shares a common data cache and a common instruction cache. Load, store, and fetch operations are serviced by a common bus interface. High performance AXI bus 74 and a lower performance AHB bus 102 are used to connect the data and instruction traffic to off-core memory and peripherals. An integrated level two memory (cache and/or TCM) input 98 is optional. Peripheral access may be through memory-mapped loads and stores. The physical address partition between AHB and AXI may be configured at the MSM level.

Clearly, the presented architecture for DSP 40 may evolve and change over time. For example, the number of instruction caches that DSP 40 may use could change from six to one, or other numbers of caches. Superscalar dispatch, L1 data at TCM 100, and other architectural aspects may change. However, the present subject matter may have continued relevance in a wide variety of configurations and for a large family of modifications of DSP 40.

ISDB 82, through JTAG interface 84, provides a hardware debugger for DSP 40. ISDB 82 provides software debug features through JTAG interface 84 by sharing system or supervisor-only registers, that are divided into supervisor control registers 80 on a per thread basis, as well as global control registers 106 between all threads. The system control registers are used for per thread interrupt and exception control and per thread memory management activities. Global registers allow interacting with the ISDB 82 for debugging operations.

ISDB 82 enables software developers to debug their software while DSP 40 operates. ISDB 82 hardware, in combination with a software debugger program operating in ISDB 82, may be used to debug the DSP 40 operating system software. ISDB 82 supports debugging hardware threads individually. Users may suspend thread execution, view and alter thread registers, view and alter instruction and data memory, single step threads, stuff instructions to threads, and resume thread execution. Trusted users have access to all of ISDB 82 features, while untrusted users have access to a subset of features.

ISDB 82 may interface with a debugger interface card to communicate with ISDB 82 debugging software residing on a program counter, yet all through JTAG interface 84. Host debugger software may interact with the ISDB 82 by reading and writing ISDB control registers. Communication, for example, may be through a 40-bit packet which identifies the ISDB register to which read/write is to occur, as well as a 32-bit data payload. A packet format supporting this operation may be up to 64 control registers which may be 32 bits wide each.

ISDB 82 includes a trusted register for controlling security during a debugging operation. If the ISDB 82 trusted is set, then all ISDB 82 registers are visible to the debugger software, and all ISDB commands are available for use. In the case that ISDB trusted is cleared, then ISDB 82 only permits a restricted set of operations. These aspects of the present disclosure appear in more detail below.

Certain ISDB 82 registers may be made visible to core software. These are accessible via SUPERVISOR mode control register transfer instructions. The core instructions include a breakpoint instruction. When ISDB trusted is set, this instruction causes the executing thread to enter a debugging operational mode. This transition shifts thread control to ISDB 82. In addition to the thread that executed a breakpoint, other threads may optionally enter DEBUG mode 150 according to ISDB 82 programming. If ISDB 82 is not trusted or not enabled, this instruction is treated as a NOP. Preferably, the breakpoint instruction is the only instruction in a packet.

FIG. 4 shows important aspects of ISDB/JTAG interface 110 between the debugging mechanism and the core processor of the disclosed subject matter. In association with DSP 40 core architecture 70, ISDB 82 communicates with JTAG 84 via path JTAG interface path 112, from ISDB JTAG circuit 114. ISDB JTAG circuit 114 processes data flows between JTAG 84 and ISDB 82. ISDB JTAG circuit 114 further interfaces ISDB JTAGSync circuit 116. ISDB JTAGSync circuit 116 communicates further with ISDB controller 118, instruction unit (IU) 150 and control unit (CU) 122. Particularly, ISDB JTAGSync circuit 116 interfaces IU ISDB logic circuit of IU 150 and CU ISDB Controller 126 of CU 122. CU ISDB controller 126 communicates with CU ISDB logic circuit 128, as well as ISDB controller 118. Control outputs from ISDB controller 118 include ISDB data output 130, ISDB reset signal 132, and ISDB interrupt 134. Further interfaces to ISDB controller 118 include MCD interface 136 and ETM breakpoint trigger 138.

Having listed the various components of ISDB 82 what follow are a brief operational description and introduction to the constituent parts of the control or logic circuitry for performing non-intrusive trusted and untrusted debugging operations of DSP 40. ISDB controller 118 handles a variety of tasks, including (a) implementing various ISDB registers; (b) synchronizing the MCD external breakpoint and resume triggers and the ETM breakpoint trigger to DSP 40 before they are forwarded to CU 122 for further processing; (c) generating MCD breakpoint and resume triggers based on debug mode status of core; and (d) adding a pipeline stage for signals sent out to DSP 40 sub-system, such as ISDB interrupt, breakpoint event etc.

CU 122 includes circuitry and instructions capable of handling the tasks such as (a) processing breakpoints and generating breakpoint triggers to each thread; (b) generating microbreakpoint and micro-resume commands; (c) maintaining ISDB 82 status and mailbox registers; and (d) implementing the certain ISDB 82 registers. CU 122 includes a breakpoint processing logic (BPL) block as appears in FIG. 6 for processing all the breakpoints and generating a macro breakpoint request to a micro-command generator of CU ISDB controller 126. The micro-command generator processes the macro breakpoint request along with instruction stuff commands, instruction step and resume commands and issues microbreakpoint and resume commands to CU 122 for pipeline control.

CU ISDB controller 128 maintains the state of ISDB 82 based on the breakpoint and resume acknowledge signals received back. The mailbox functions of CU ISDB controller 126 maintain mailbox registers used for communication between the host debug software and the DSP 40 core processor. These mailbox functions also contain ISDB 82 status registers.

FIG. 5 presents a processing mode diagram 140 for the various mode control aspects of DSP 40, including operations of ISDB 82 during debugging processes. In FIG. 5, DSP 40 supports processing modes that are both global to all threads and local to individual threads. Each DSP 40 hardware thread individually supports two execution modes, USER mode 142 and SUPERVISOR mode 144, and three non-processing modes of WAIT mode 146, OFF mode 148, and DEBUG mode 150, all as may appear in FIG. 5. The mode of a thread is independent of other threads, for example one thread may be in WAIT mode 146 while another is in USER mode 142, and so on.

The per-thread mode state diagram of FIG. 5 is supported by various instructions or events. These include "Except" or internal exception event, an "Int" or external interrupt event, an "RTE" or software return instruction from exception mode, and "SSR" or update to SSR register instruction, a "Stop" or software stop instruction that may be entered from any mode, a "Start" or software Start Instruction that also may be entered from any mode, a "trap" or software Trap Instruction, a "Wait" or software wait Instruction, a "Resume" or software Resume Instruction, a "DE" or Debug Event, and a "DR" or Debug Instruction. While the functions in different implementations of the claimed subject matter may vary slightly from those here presented, the meanings of "Start," "Wait," "Resume," "DE," and/or "DR" may be given their broadest interpretations consistent with the scope of the claimed subject matter.

Registers are available in DSP 40 in both USER mode 142 and SUPERVISOR mode 144. The user-mode registers are divided into a set of general registers and a set of control registers. General registers are used for all general purpose computation including address generation, scalar and vector arithmetic. Control registers support special-purpose functionality such as hardware loops, predicates, etc. General purpose registers are 32 bits wide and may be accessed as single registers or as aligned pairs of two registers. The general register file provides all operands for instructions, including addresses for load/store, data operands for numeric instructions, and vector operands for vector instructions.

DEBUG mode 150 provides a special state where the thread is waiting for commands from ISDB 82. Whenever an ISDB Debug Event occurs, such as by the execution of a software breakpoint instruction, a breakpoint command from ISDB 82, or occurrence of a hardware breakpoint, indicated threads may enter DEBUG mode 150. While in DEBUG mode 150, the core is controlled by ISDB 82 via commands from JTAG interface 84. When the ISDB 82 releases the thread due to execution of a resume command, the thread may resume operation according to their current mode settings. When a thread is in DEBUG mode 150, it is controlled by ISDB 82 and cannot be controlled by other threads. A Wait, Resume, Start, or Stop instruction from a running thread, targeting a thread in DEBUG mode 150, may be ignored. Similarly, a Non-Maskable Interrupt (NMI) may be ignored by threads in DEBUG mode 150.

A HARDWARE RESET mode (not shown in FIG. 5) and DEBUG mode 150 are global to all threads. Whenever the hardware reset pin is asserted, regardless of any thread's processing state, DSP 40 may enter HARDWARE RESET Mode. In HARDWARE RESET mode, all registers are set to their reset values. No processing may occur until the hardware reset pin is de-asserted. When the reset pin is asserted, the processor may transition into reset mode and all registers may be reset to their HARDWARE RESET values. After the reset pin is de-asserted, thread T0 may be given a soft reset interrupt. This may cause thread T0 to enter SUPERVISOR mode 144 and begin executing at the reset vector location. All other threads may remain off. At this point, the software is free to control mode transitions for each thread individually.

In FIG. 6, it is seen that breakpoint logic or BPL circuit 160 of CU ISDB controller 126 (FIG. 4) includes breakpoint triggers from six different sources, including hardware breakpoints 0/1 (HWBKPT0 162 and HWBKPT1 164), software breakpoint (SWBKPT 166), JTAG 84 breakpoint (JTAG-BKPT 168), ETM (embedded trace macro) breakpoint (ETMBKPT 170), and external breakpoint (EXTBKPT 172). Breakpoint triggers 162 through 172 and debug mode status input 174 go to encode breakpoint encoder 176 to cause DSP 40 to operate in DEBUG mode 150. Output from encoder 176 includes three (3) breakpoint information bits 178 and a breakpoint valid bit 180. Breakpoint information data 178 enters breakpoint information circuit 182 to cause a breakpoint information JTAG interface command 184. Breakpoint bit 180 also generates OR gate input 186 and reset circuit 188 input. Reset circuit 188 receives either a UCG resume thread number or a reset input 192 to generate reset control output 194 into OR gate 196. Either valid bit 186 or reset output 194 may cause OR gate 196 to generate BPL 160 breakpoint output 198.

The breakpoint triggers in BPL circuit 160 are processed along with the corresponding TNUM mask to generate macro breakpoint trigger to each of the threads. The macro breakpoint trigger 198, bpl_breakTnum_ANY[0], is maintained until the corresponding thread is resumed. The number of pipeline stages that can be used in BPL 160 is driven by hardware breakpoints which are precise breakpoints, i.e., the instruction that triggers hardware breakpoint match must not be executed. The thread switches to debug mode after executing the program until that instruction. The disclosed embodiment provides a macro breakpoint trigger one cycle after the breakpoint triggers arrive. For that reason the breakValid input 176 is logically OR'ed with its latched version input 192 to generate bpl_breakTnum_ANY[0] output 198.

Through the use of breakpoints, the six threads of DSP 40 may individually enter and exit DEBUG mode 150. A breakpoint trigger may come from five sources which correspond to the five different types of breakpoints supported in ISDB 82. Upon hitting a breakpoint, a thread transitions from its current mode (e.g., WAIT/RUN) to DEBUG mode 150. In DEBUG mode 150, the thread waits for commands from ISDB 82. A thread in OFF mode 148 is powered down and may not accept any commands from ISDB 82. The latency of entering DEBUG mode 150 is implementation defined, such as in the present disclosure as relating to the event a power collapse. For example, an implementation may choose to complete a given operation, for example finish an outstanding load request, before entering DEBUG mode 150. In one embodiment, a thread identifier register contains an 8-bit read/write field and is used for holding a software thread identifier. This field is used by the hardware debugger to match breakpoints.

There are a number of different ways to enter a breakpoint process. For example, for HWBKPT1 162 and HWBKPT2 164 breakpoints, if a register equals a predetermined value, then when the program counter (PC) matches the predetermined value, then the process goes into the DEBUG mode 150. ASIDs (Address Space Identifiers) are tags similar to process IDs in a process or a particular thread in a multi-threaded process. So, physical address, virtual address, ASID, PC, or other qualifiers may be used to optionally obtain a fix of the location of the program in a space at which point a breakpoint may occur. The uses of breakpoints here referenced are more particularly disclosed in the commonly-assigned U.S. patent applications by L. Codrescu, et al, and entitled NON-INTRUSIVE, THREAD-SELECTIVE, DEBUGGING METHOD AND SYSTEM FOR A MULTI-THREADED DIGITAL SIGNAL PROCESSOR. The disclosed subject matter provides a path for moving into a DEBUG mode 150 in the event of a breakpoint such as those of FIG. 6. The disclosed subject matter controls which thread or sets of threads in the DSP 40 go into the DEBUG mode 150.

Of significance for the present disclosure is the embedded trace macrocell (ETM) unit of DSP 40, which enhances user debugging of code by capturing in real-time detailed information about the software execution flow. The ETM non-intrusively monitors and records selected DSP 40 execution, forms the execution information into packets, and sends out the packet stream either off-chip or to an on-chip memory known as an ETB. The ETM also contains a number of mechanisms to limit or focus the generation of trace information to the region of interest. Using the packet stream, a reconstruction of the execution can be created, giving the user direct visibility of the code's runtime behavior.

FIG. 7 shows an aspect of an ISDB JTAGSync circuit for performing the initiating debugging procedures here disclosed in association with the various embedded trace macrocell functions. To demonstrate illustrative circuitry for performing the presently disclosed trusted and untrusted debugging operations, FIG. 7 includes ISDB JTAGSync circuit 200. ISDB JTAGSync circuit 200 includes an ISDB test data register 202 which DSP 40 may use to read and write the ISDB control registers. ISDB JTAGSync circuit 200 provides the synchronization logic between the ISDB test data register 202 operating on DB_tck and the ISDB control registers 204 operating in the DSP 40 clock domain. By reading and writing the ISDB control registers, DSP 40 performs various debug tasks supported by the ISDB 82.

In the implementation of FIG. 7, ISDB JTAGSync circuit 200 receives JTAG_isdb_chain_in signal 206 into ISDB Test Data Register 204 to generate JTAG_isdb_chain_out signal 208. ISDB Test Data Register 202 includes read/write (R/W) bits 210, Address bits [6:0] 212, and Data bits [31:0] 214. Values in R/W bits 210 go to AND gate 216, as do Sync circuit 216 output and CU_trustedDebug input 220. JTAG_isdb_chain_update_tkl signal 222 and ISDB_CLK signal 224 control the operation of Sync circuit 218. Address information from Address bits 212 may be received by Address Decode circuit 220, which feeds ISDB Registers 204. ISDB Registers 204 transfers data with Data bits [31:0] in response to a write enable signal 228 from AND gate 216.

ETM provides comprehensive debug and trace facilities for DSP 40 and other similar digital signal processors. They allow information on the processor's state to be captured both before and after a specific event, while adding no burden to the processor's performance, as DSP 40 runs at full speed. The ETM may be configured in software to capture only select trace information and only after a specific sequence of conditions. A dedicated, configurable, trace port and FIFO then allow the compressed trace data to be read from the chip by an external trace port analyzer without interrupting, or affecting, the processor.

The trace port can be configured from a 1- to 32-bit data bus, with trace clock independent to the core clock. For example, the data rate from the ETM can be half of the core clock and the number of pins increased to maintain the data bandwidth. Similarly, the number of pins can be halved and the data rate increased. The ETM may be used in both stand-alone and within a multi-core environment to allow the developer to view simultaneous, correlated trace from multiple, asynchronous cores.

FIG. 8 provides block diagram 230 depicting overall ETM 232 functions here provided. DSP 40 core processor 70 interfaces ETM 232, which includes triggering and filtering circuit 234 and compression and packetization circuit 236. Following processing by triggering and filtering circuit 234 and compression and packetization circuit 236, ETM output 238 flows to trace repository 240, which may be, for example, an embedded trace buffer (ETB) circuit or an off-chip circuit. From trace repository 240, software execution records flow as output records 242 to debug host or ISDB 82. ISDB 82 includes decompressor component 244 for receiving trace repository output record 242 and generating therefrom reconstructed execution flow 246. ETM 232 receives control input 248 from JTAG 84, which input JTAG 84 generates in response to data and instructions from ISDB 82.

As shown in FIG. 8, the ETM 232 monitors the DSP 40 pipeline. Using this information, ETM 232 performs two primary functions: filtering/triggering and compression/packetization. The filtering and triggering operations are programmed by the user through JTAG interface 84 and are used to define when to turn tracing on and off. The compression/packetization unit takes the DSP 40 execution information and efficiently forms it into packets that are sent out of ETM 232 through the trace port. The trace-stream leaving ETM 232 is fed into trace repository 240. Trace repository 240 provides a large memory capacity for recording trace records and may be either off-chip or on-chip. The on-chip repository is known as an embedded trace buffer (ETB). Decompressor component 244 is a software component running on ISDB 82 that takes the packet stream from trace repository 240 and, along with the program image, reconstructs the execution flow of DSP 40, giving the user detailed visibility into the DSP pipeline 66. ETM 232 provides trace instruction sequencing and timing for all six threads, as well as the ability to record and send out profiling counts (cache misses, bank conflicts, and micro-tlb misses). ETM 232 may trigger on PC and LDST addresses, as well as on LDST data. ETM 232 supports serial and external event detections. Moreover ETM 232 has the ability to generate ISDB breakpoint trigger events, external trigger event, and DSP 40 interrupts. ETM 232 is programmable through JTAG 84 and may support a dedicated ETB trace repository 240 of 512×32 bits, in one embodiment. ETM 232 may contain 4-trigger blocks (each with 2 address and 1 data comparators) and may contain a 3-state sequencer. ETM 232 tracing may operate under the control of a secure DSP 40 enable register, and may be programmed for operation during DSP 40 power collapse.

ETM 232 generates an instruction trace as a recording of the full progression of the program counter for a thread over a given window in time. Optionally, the timing of the program counter progression (i.e., identification of stall cycles) can also be included in an instruction trace. The event-resources mechanisms are used to define when to generate these instruction traces. The trigger and filtering functions are controlled through the programming of the event-resources. In more detail, the event-resources control filtering, triggering, and ISDB 82 breakpoint generation. Filtering includes the functions of deciding when to enable and disable an instruction trace. Triggering involves deciding when to insert a trigger marker into the packet stream. ISDB 82 breakpoint determination involves specifying the conditions under which ISDB 82 generates and responds to a breakpoint for debugging operations.

ETM 232 contains a number of primary event resources (e.g., address and data comparators) to detect when specific conditions within DSP 40 occur (e.g., whether a certain PC is executed, or if a certain memory location is read). In addition, there are secondary event resources (trigger blocks and the sequencer) which enable detection of more complex arrangements of events.

ETB trace repository 240 provides an on-chip memory area where trace information is stored during capture rather than being exported immediately through a trace port at the pins of the device. The stored information can then be read out at a reduced clock rate from ETB trace repository 240 once capture has been completed. This is done through JTAG interface 84. This two step process removes the necessity for a wide trace port that uses many, high-speed device pins. Effectively, a "zero-pin" trace port is created where the device already has a JTAG port at the pins. ETB trace repository 240 may accept data at a higher frequency and with the full 32-bit data port, exceeding trace port bandwidth limitations and may integrate with a RAM block supplied by the system integrator.

In one embodiment, ETB trace repository 240 has a size of 2 KB arranged as 512 entries, each 32-bits wide. ETB trace repository 240 interfaces with the user through a set of JTAG accessible registers. Each register can be read or written through JTAG interface 84. These registers are used to set up ETB trace repository 240 for a trace-capture session and to read out the contents of ETB trace repository 240 once trace capture is complete. ETB trace repository 240 provides a read-pointer as an index into the ETB trace repository 240 memory array. When reading out the contents of ETB trace repository 240 through JTAG interface 84, the read-pointer indicates the location to read. ETB trace repository 240 also provides a write-pointer as an index into the ETB trace repository 240 memory array. When trace data is written into ETB trace repository 240, it is written to the entry indicated by the write-pointer. Each of the write operations auto-increment the write-pointer to the next location after write occurs. ETB trace repository 240 may only capture a small window of the ETM trace stream. The ETB looks for a trigger packet from the ETM to determine when to capture data and the trigger-counter is used to specify the division between pre-trigger data and post-trigger data captured by ETB trace repository 240.

FIG. 9 shows a trigger block circuit 250 in ETM 232. ETM 232 for the disclosed embodiment of DSP 40 contains four trigger blocks, each with two single address comparator (SAC) circuits 252 and 254, one data comparator (DC) circuit 256, and a 16-bit counter circuit 258. Trigger block circuit 250 may be divided in two major sections of triggering portion 260 and filtering portion 262. Triggering portion 260 feeds into the sequencer (described below) and controls when the sequencer changes state. In triggering portion 260, SAC circuits 252:254 feed AND/OR circuit 264, which itself feeds AND circuit 266 along with DC circuit 256. Output from AND circuit 266 feeds counter circuit 258 for generating trigger match signal 268. Filtering portion 262 determines when to enable or disable instruction tracing. In filtering portion 262, SAC circuits 252:254 feed AND circuit 270. SAC circuit also feeds state-enable circuit 272 and SAC circuit feeds state-enable circuit 274. Also, AND circuit 270 feeds state-enable circuit 276. OR circuit receives signals from state-enable circuits 272:276 for generating trace enable output 280. Each trigger block circuit 250 provides thread matching circuit 282, which is described in greater detail in FIG. 10 below.

Each trigger block circuit 250 contains ASID and TID match registers to optionally limit SAC circuit 252 and DC circuit 256 matches to a particular thread or group of threads. In addition, each trigger block circuit 250 may be limited to a single hardware thread. SAC circuit 252 detects when an address generated by a memory access instruction matches a pre-programmed value. SAC circuit 252 supports 32-bit comparison. The memory source for the comparison is programmable among program counter and load/store address. For one embodiment, the comparison type may be programmable with the following options: equal (==), not-equal (!=), greater-than-or-equal (>=), or less-than (<) The access-type can be restricted to load-or-store, load-only or store-only. In such an embodiment, SAC circuit 252:254 may support only virtual address matching for each memory source.

DC circuit 256 detects when a memory access data value matches a pre-programmed value and can perform 32-bit comparisons. For 64-bit accesses, source is programmable between upper and lower-word. Supports equal (==) and not-equal (!=) comparison types. A 32-bit mask register may be used to filter out portions of the comparison. DC circuit 256 supports any-byte matching and the access-type can be set as load-or-store, load-only, or store-only. In addition, output of DC circuit 256 may be selectably disabled.

SAC circuit 252:254 and DC circuit 256 matches determine when counter circuit 258 decrements. As shown in FIG. 9, SAC circuit 252:254 match results can either be ANDed or ORed together. This result is then combined with the DC circuit 256 match result. This final result is used to enable counter circuit 258. Counter circuit 258 may be preloaded with a user-defined value and decrement as matches occur. When the trigger counter reaches 0, the trigger block signals a match to the sequencer.

Counter circuit 258 contains a three-bit state enable mask that controls when the counter is reloaded. When a new state is entered, if this state matches one of the enabled states in the state-enable mask then the counter is reloaded. The counter is also automatically reloaded anytime it reaches zero. The counter can be bypassed by setting the count to 1. The match results from the two SAC circuits 252:254 are also used to enable or disable instruction flow tracing.

Filtering portion 262 permits trigger block circuit 250 to trace on individual SAC circuit 252 matches. Thus, for each SAC circuit 252:254, if the associated state-enable mask matches and if SAC circuit matches, tracing is enabled. Trace can occur also on address range match. Tracing is enabled based on the AND of SAC circuit 252:254 matches. The match is then further qualified with a state-enable-mask. Each of the three trace sources has a separate three-bit state enable mask to qualify the match with the current state. Using the above rules, the user may, for example, define different trace regions. One region may include trace instructions flow for thread i if the program counter (PC) is greater than 100 and less than 200, and only if the circuit is in state 1.

A second region may be for trace instruction flow for thread j if the PC is less than 100 and if we are in state 0 or if the PC is greater than 200 and in state 2. Because multiple trigger-blocks exist, the final trace enable is the OR of each trigger-block's trace-enable. All threads that match the combined results of the address comparison, the state-enabling, and the thread-matching may be traced. If multiple active threads match the enabling conditions, those threads may be traced concurrently.

FIG. 10 presents thread matching circuit 282, which responds to TID input 284, ASID input 286, and TNUM input 288. TID input 284 feeds to AND circuit 290, which also receives an inverse feed from TID mask circuit 292. The inverse of TID mask circuit 292 also feeds to AND circuit 294 along with TID match circuit 296 output. AND circuits 290 and 294 are compared at comparator 298, the output of which feeds to OR circuit 300. OR circuit 300 logically ORs the comparator circuit 298 output with the inverse of TID match enable circuit 302 to feed AND circuit 304. Comparator circuit 306 compares ASID input 286 to ASIC match circuit 308 output for generating a feed to OR circuit 310. OR circuit 310 generates output 312 from the logical OR of the ASID match enable circuit 314 inverted signal. Finally, TNUM input 288 is compared at comparator circuit 316 with the output from TNUM match circuit 318 to generate input signal 320. OR circuit 322 logically ORs input 320 with the inverse input from TNUM match enable circuit 324. In generating thread match signal 326, AND circuit 304 logically ANDs the output from OR circuits 300, 310, and 322.

Each trigger block circuit 250, therefore, thread-match circuit 282, which functions to limit the operation of both triggering portion 260 and filtering portion 262 to a particular thread or group of threads. Each trigger block contains TID match circuit 296, TID mask circuit 292, ASID match enable circuit 314, and TNUM match enable circuit 324. To use this capability, the match registers may be programmed with reference values that are used to compare against the current thread's identifiers. For a TID match circuit 296, the comparison can be restricted to certain portion of the TID through the TID mask circuit 292. This allows a group of TIDs to be matched. In addition, for each match type, the matching can be disabled through user programmable enable registers. trigger block circuit 250 only operates on threads that meet all of the qualifying conditions.

One aspect of ETM 232 includes a sequencer process for chaining of events and more complex event detection scenarios. To illustrate operation of the sequencer process and associated trigger block circuits 250, FIG. 11 presents sequencer flow diagram 330. In response to trigger block circuit inputs 332:338, sequencer process 330 operates in the shown example at three states, S0:S2. For operation of sequencer process 310, from state S0 process flow may go to S1 or S2. From S1, sequencing advances either ahead to S2 or back to S0. From S2, sequencing advances to either S1 or S0.

Sequencer process 330, therefore, includes three states S0:S2, with the transitions between states being programmable and based on matches from trigger blocks circuits 332:338. The table of FIG. 12 lists the programmable rules for each transition. Sequencer process 330 has use in trace filtering for enabling each trigger blocks circuits 332:338 to be conditioned on state-enables. This allows tracing to be restricted to certain states. Upon entering a new state, the counter in each trigger blocks circuits 332:338 may be reloaded to an initial value. Upon entering a given state, an ISDB 82 breakpoint can be asserted. Upon entering a given state, a trigger marker can be inserted into the trace stream. Upon entering a given state, an external trigger control may also be asserted. The external trigger may remain asserted anytime that the sequencer is in the given state. Upon entering a given state, an interrupt to DSP 40 may be asserted. After reset, the counter is initialized to state 0. If multiple transitions fire at the same time, the sequencer remains in the current state.

ETM contains six counters that can record various events related to DSP 40 performance. The basic operation makes use of each counter as a programmable source. A user-programmable region counter divides execution into windows of a fixed number of cycles. During the window, the events are accumulated into counters. At the end of the window, the counter values are formed into packets and sent out through the trace port. The counters are then reset and the process begins again. When the profiling unit is operated in at the same time as the program flow tracing, this results in the program flow trace being overlaid with detailed information about performance events. In addition, the profiling unit contains a state-enable mask to limit when the unit is active.

A region counter is used to divide up the execution into windows of a fixed number of cycles. The size of the region is determined by a user-programmable register. The region counter is initialized to the user-specified value, and all of the profiling-event counters are reset. The region counter then begins counting down. When the region counter reaches zero, the value for each of the profiling-event counts is emitted in the trace stream. The process then begins again. The region-counter only counts when the state-enable matches. When the profiling is inactive, the region counter maintains its value and resumes when an enabled state is re-entered.

Different events for which a profiling counter may accumulate information include (a) d-cache misses; (b) d-cache stall cycles; (c) i-cache misses; (d) i-cache stall cycles; (e) ITLB and DTLB misses; and (f) total stall cycles. In addition, each profiling counter contains a six-thread mask to restrict the counter to events that occur in certain hardware threads.

As with the region counter, the profiling counters are only active when the state-enable mask matches the current state. During all other times the counts maintain their values and counting resumes when an enabled state is re-entered.

The functioning of ETM 232 is determined by the setting of various user-programmable registers. Each register is accessed through JTAG interface 84. FIG. 13 provides a table listing ETM 232 control registers for this purpose.

In summary, the disclosed subject matter provides a method and system for improving software instruction debugging operations by capturing real-time information relating to software execution flow in a processor. The method and system include and instructions and circuitry for operating a core processor process within a core processor associated with the digital signal processor. The disclosed subject matter operates a non-intrusive debugging process within a debugging mechanism of the digital signal processor. Non-intrusively monitoring in real time predetermined aspects of software execution associated with the core processing process and occurring in real-time on the processor, using an embedded trace macrocell. The embedded trace macrocell records selectable aspects of the non-intrusively monitored software execution and generates at least one breakpoint in response to events arising within the selectable aspects of the non-intrusively monitored software execution. The present disclosure controls aspects of the non-intrusive debugging process in response to at least one breakpoint. As a result, the disclosed subject matter cooperates with the non-intrusive debugging process for multi-thread trace instruction sequencing and timing for up to all threads of a multi-threaded digital signal processor.

The processing features and functions described herein for trusted and untrusted non-intrusive, thread-selective, debugging in a multi-threaded digital signal processor may be implemented in various manners. For example, not only may DSP 40 perform the above-described operations, but also the present embodiments may be implemented in an application specific integrated circuit (ASIC), a microcontroller, a digital signal processor, or other electronic circuits designed to perform the functions described herein. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method for software instruction debugging by capturing real-time information relating to software execution flow in a digital signal processor, comprising:
 operating a non-intrusive debugging process within a debugging mechanism of the digital signal processor, the debugging mechanism associated with a core processor of the digital signal processor, wherein the digital signal processor includes a plurality of threads;
 non-intrusively monitoring software execution in real-time for predetermined aspects of software execution associated with the core processor;
 recording selectable aspects of the non-intrusively monitored software execution;
 generating at least one breakpoint in response to events arising within the selectable aspects of the non-intrusively monitored software execution, wherein the at least one breakpoint is generated from at least one of a plurality of breakpoint triggers that includes a hardware breakpoint trigger and an embedded trace macrocell breakpoint trigger;
 controlling aspects of the non-intrusive debugging process in response to the at least one breakpoint; and
 generating by the debugging mechanism a thread match signal based on at least one address space identifier of at least one of the plurality of threads, wherein the thread match signal matches the at least one of the plurality of threads to the at least one breakpoint.

2. The method of claim 1, further comprising generating at least one record in response to a predetermined set of profiling counts.

3. The method of claim 1, further comprising non-intrusively monitoring the software execution of a selectable number of threads of the digital signal processor.

4. The method of claim 1, further comprising generating in response to a program counter value a trigger for initiating the non-intrusive debugging process.

5. The method of claim 1, further comprising generating a trigger for initiating the non-intrusive debugging process in response to a load/store address used in the software execution.

6. The method of claim 1, further comprising generating a plurality of records in response to a sequence of events occurring in the software execution.

7. The method of claim 1, further comprising generating at least one record in response to an external event occurring in relation to the software execution.

8. The method of claim 1, further comprising programming operation of the non-intrusive monitoring and the recording using a JTAG interface.

9. The method of claim 1, further comprising generating a packet stream of records derived from the recording for transmitting to a recording medium.

10. The method of claim 1, further comprising generating a packet stream of records derived from the recording for transmitting to an embedded trace buffer recording medium.

11. The method of claim 1, wherein the thread match signal is further based on a thread identifier of the at least one thread and a thread number of the at least one thread.

12. The method of claim 1, wherein a first of the plurality of threads operates in a debug mode independently of a mode of operation of other threads of the plurality of threads.

13. The method of claim 1, wherein the at least one of a plurality of breakpoint triggers includes a second hardware breakpoint trigger.

14. The method of claim 1, wherein the at least one of a plurality of breakpoint triggers includes a JTAG breakpoint trigger.

15. A digital signal processor debugging system for operation in association with a digital signal processor and including the ability to capture real-time information relating to software execution flow in a processor, comprising:
  a debugging mechanism of the digital signal processor, the debugging mechanism associated with a core processor of the digital signal processor and operating a non-intrusive debugging process, wherein the digital signal processor includes a plurality of threads;
  an embedded trace macrocell for non-intrusively monitoring software execution in real-time for predetermined aspects of software execution associated with the core processor;
  recording instructions and associated circuitry for the embedded trace macrocell for recording selectable aspects of the non-intrusively monitored software execution;
  a breakpoint generating instruction associated with the debugging mechanism and the embedded trace macrocell for generating at least one breakpoint in response to events arising within the selectable aspects of the non-intrusively monitored software execution, wherein the at least one breakpoint is generated from at least one of a plurality of breakpoint triggers that includes a hardware breakpoint trigger and an embedded trace macrocell breakpoint trigger; and
  control instructions associated with the debugging mechanism for initiating the non-intrusive debugging process in response to the at least one breakpoint,
  wherein the debugging mechanism is configured to generate a thread match signal based on at least one address space identifier of at least one of the plurality of threads and wherein the thread match signal matches the at least one of the plurality of threads to the at least one breakpoint.

16. The digital signal processor debugging system of claim 15, wherein the embedded trace macrocell generates at least one record in response to a predetermined set of profiling counts.

17. The digital signal processor debugging system of claim 15, wherein the plurality of threads comprises a selectable number of threads.

18. The digital signal processor debugging system of claim 15, wherein the debugging mechanism generates a trigger for initiating the non-intrusive debugging process in response to a program counter value.

19. The digital signal processor debugging system of claim 15, wherein the debugging mechanism generates a trigger for initiating the non-intrusive debugging process in response to a load/store address used in the software execution.

20. The digital signal processor debugging system of claim 15, wherein the embedded trace macrocell generates a plurality of records in response to a sequence of events occurring in the software execution.

21. The digital signal processor debugging system of claim 15, wherein the embedded trace macrocell generates at least one record in response to an external event occurring in relation to the software execution.

22. The digital signal processor debugging system of claim 15, further comprising a JTAG interface for programming the operation of the non-intrusive monitoring and for programming the recording instructions and associated circuitry.

23. The digital signal processor debugging system of claim 15, further comprising a packet stream of records derived from the recording instructions and associated circuitry to transmit to a recording medium.

24. The digital signal processor debugging system of claim 15, further comprising an embedded trace buffer for storing a packet stream of records derived from use of the recording instructions and associated circuitry.

25. The digital signal processor debugging system of claim 15, wherein the debugging mechanism includes at least one address comparator configured to output a signal based on an address matching a value, the value corresponding to the hardware breakpoint trigger.

26. The digital signal processor debugging system of claim 15, wherein the debugging mechanism includes a register, and wherein the debugging mechanism is further configured to cause the digital signal processor to enter a debugging mode at least partially in response to a program counter value of the digital signal processor matching a value indicated by the register.

27. The digital signal processor debugging system of claim 15, wherein the debugging mechanism includes an in-silicon debugging system (ISDB) that includes a Joint Test Action Group (JTAG) interface.

28. The digital signal processor debugging system of claim 15, wherein the debugging mechanism includes at least one of a hardware breakpoint trigger circuit associated with the hardware breakpoint trigger, an embedded trace macrocell breakpoint trigger circuit associated with the embedded trace macrocell breakpoint trigger, a software breakpoint trigger circuit associated with a software breakpoint trigger, and a Joint Test Action Group (JTAG) breakpoint trigger circuit associated with a JTAG breakpoint trigger, and wherein the plurality of breakpoint triggers further includes the software breakpoint trigger and the JTAG breakpoint trigger.

29. A digital signal processor for operation in support of a personal electronics device, the digital signal processor comprising:
  means for operating a non-intrusive debugging process within a debugging mechanism of the digital signal processor, the debugging mechanism associated with a core processing process operating on a core processor of the digital signal processor, wherein the digital signal processor includes a plurality of threads;
  means for non-intrusively monitoring software execution in real-time for predetermined aspects of software execution associated with the core processing process and occurring in real-time on the core processor;
  means for recording selectable aspects of the non-intrusively monitored software execution;
  means for generating at least one breakpoint in response to events arising within the means for recording selectable aspects of the non-intrusively monitored software execution, wherein the at least one breakpoint is generated from at least one of a plurality of breakpoint triggers that includes a hardware breakpoint trigger and an embedded trace macrocell breakpoint trigger;

means for controlling aspects of the non-intrusive debugging process in response to the at least one breakpoint; and means for generating a thread match signal based on at least one address space identifier of at least one of the plurality of threads, wherein the thread match signal matches the at least one of the plurality of threads to the at least one breakpoint.

30. The digital signal processor of claim 29, further comprising means for generating at least one record in response to a predetermined set of profiling counts.

31. The digital signal processor of claim 29, further comprising means for selecting a number of threads of the digital signal processor.

32. The digital signal processor of claim 29, further comprising means for generating a trigger for initiating the non-intrusive debugging process in response to a program counter value, in response to a load/store address used in the software execution, or any combination thereof.

33. The digital signal processor of claim 29, further comprising means for generating a plurality of records in response to a sequence of events occurring in the software execution, in response to an external event occurring in relation to the software execution, or any combination thereof.

34. The digital signal processor of claim 29, further comprising means for programming the operation of the non-intrusive monitoring and the means for recording using a JTAG interface.

35. The digital signal processor of claim 29, further comprising means for generating a packet stream of records derived from the means for recording to transmit to a recording medium, to an embedded trace buffer recording medium, or any combination thereof.

36. A non-transitory computer usable medium, comprising:

computer readable program code means for operating a non-intrusive debugging process within a debugging mechanism of a multi-threaded digital signal processor, the debugging mechanism associated with a core processor;

computer readable program code means for non-intrusively monitoring software execution in real-time for predetermined aspects of software execution associated with the core processor and occurring in real-time on the digital signal processor;

computer readable program code means for recording selectable aspects of the non-intrusively monitored software execution;

computer readable program code means for generating at least one breakpoint in response to events arising within the selectable aspects of the non-intrusively monitored software execution, wherein the at least one breakpoint is generated from at least one of a plurality of breakpoint triggers that includes a hardware breakpoint trigger and an embedded trace macrocell breakpoint trigger;

computer readable program code means for controlling aspects of the non-intrusive debugging process in response to the at least one breakpoint;

computer readable program code means for selecting at least one thread from a plurality of threads of the multi-threaded digital signal processor; and computer readable program code means for generating a thread match signal based on at least one address space identifier of at least one of the plurality of threads, wherein the thread match signal matches the at least one of the plurality of threads to the at least one breakpoint.

37. The non-transitory computer usable medium of claim 36, further comprising computer readable program code means for generating a packet stream of records derived from the computer readable program code means for recording to transmit to an embedded trace buffer recording medium.

* * * * *